United States Patent
Shibata et al.

(10) Patent No.: US 6,858,288 B2
(45) Date of Patent: Feb. 22, 2005

(54) WRAP FILM

(75) Inventors: Kaoru Shibata, Yokohama (JP); Sumio Hirotsu, Yasu-gun (JP); Yoshihito Nagura, Kusatsu (JP); Mikio Suzuki, Haga-gun (JP); Nobuya Sato, Haga-gun (JP); Haruo Sakahashi, Haga-gun (JP)

(73) Assignees: Oji Paper Co., Ltd., Tokyo (JP); Kao Corporation, Tokyo (JP)

( * ) Notice: Subject to any disclaimer, the term of this patent is extended or adjusted under 35 U.S.C. 154(b) by 0 days.

(21) Appl. No.: 09/986,370

(22) Filed: Nov. 8, 2001

(65) Prior Publication Data

US 2002/0102423 A1 Aug. 1, 2002

(30) Foreign Application Priority Data

| Nov. 8, 2000 | (JP) | 2000-340916 |
| Jan. 15, 2001 | (JP) | 2001-007037 |
| Sep. 19, 2001 | (JP) | 2001-284816 |

(51) Int. Cl.[7] .......................... B32B 27/08; B32B 27/28
(52) U.S. Cl. .................. 428/213; 428/515; 428/516; 428/517; 428/521; 428/523; 428/910
(58) Field of Search ............... 428/213, 515, 428/516, 517, 521, 523, 910

(56) References Cited

U.S. PATENT DOCUMENTS

| 4,294,889 A | 10/1981 | Hashimoto | 428/515 |
| 4,339,495 A | 7/1982 | Weiner | 428/349 |
| 5,356,677 A * | 10/1994 | Meilhon et al. | 428/34.9 |
| 5,766,772 A * | 6/1998 | Ciocca et al. | 428/516 |
| 6,117,553 A | 9/2000 | Hayashida et al. | 428/412 |
| 2003/0120014 A1 * | 6/2003 | Seta et al. | 526/348.1 |

FOREIGN PATENT DOCUMENTS

| DE | 19749765 A1 | 6/1998 |
| EP | 0 210 750 A2 | 2/1987 |
| EP | 0 301 773 A2 | 2/1989 |
| EP | 0488179 A1 | 6/1992 |
| EP | 0524572 A1 | 1/1993 |
| EP | 0 597 502 A2 | 5/1994 |
| EP | 0947542 A1 | 10/1999 |
| JP | 58-065632 | 4/1983 |
| JP | 59-120635 | 7/1984 |
| JP | 05-116262 | 5/1993 |
| JP | 08-080600 | 3/1996 |

OTHER PUBLICATIONS

Abstract of JP 4328144A, Nov. 17, 1992.
Abstract of JP 9003273A, Jan. 7, 1997.
Abstract of JP 4334449A, Nov. 20, 1992.
Abstract of JP 56005842A, Jan. 21, 1981.

* cited by examiner

Primary Examiner—D. S. Nakarani
(74) Attorney, Agent, or Firm—Birch, Stewart, Kolasch & Birch, LLP

(57) ABSTRACT

A wrap film comprising a thermoplastic resin composition and having a longitudinal direction elongation at break of less than 100% and a longitudinal direction strength at 5% elongation of 150 cN/10 mm or less is disclosed. The thermoplastic resin composition comprises a polypropylene resin and at least one resin having a flexural modulus of 100 MPa or less selected from an ethylene-propylene rubber and an ethylene-α-olefin copolymer having 4 or more carbon atoms in the α-olefin unit.

27 Claims, 1 Drawing Sheet

PUSH-PULL GAUGE

WRAP FILM

BACKGROUND OF THE INVENTION

The present invention relates to wrap film for domestic and commercial use and, more particularly, to wrap film satisfactory in safety, saw blade cutting properties, cling, transparency, tear resistance, and unwinding properties, and suitable to microwave heating, refrigerating, and freezing. The present invention also relates to a biaxially stretched polyolefin multilayer film which is excellent in unwinding properties, cutting properties, cling, and heat resistance, generates little harmful gas on combustion, and economically provides wrap films, such as a household wrap film.

Wrap films for home use or commercial use which are typically used to overwrap foods mainly comprise polyvinylidene chloride (PVDC), polyvinyl chloride (PVC), polyethylene (PE) or polypropylene (PP).

Stretched film mainly comprising PVDC which is widespread as household wrap film has satisfactory clinging properties and saw blade cutting properties in good balance but, because of its high tensile strength, lacks flexible deformability to cling in conformity to the shape of a container as obtained with stretch wrap film for commercial use hereinafter described. While it exhibits relatively satisfactory cling to objects with high surface smoothness such as glass, it fails to cling to containers which do not have high surface smoothness such as resins and metals with such intimate contact that a liquid in the container may not leak or spill.

Stretch wrap films for commercial use are flexible films including a single layer film of PVC and a single layer or multilayer film comprising PE, PP or an ethylene-vinyl acetate polymer. These films are easily conformed to the shape of containers because of their low tensile strength to achieve cling such that a liquid in the container may not leak or spill. Having a high elongation at break in nature of use, however, they are hardly cut or do not cut sharply with a safe saw blade used for wrap film for domestic use. PE or PP wrap films designed for domestic use are not convenient to use due to insufficient contact and cutting properties.

Containing chlorine, PVDC and PVC can generate dioxins on incineration, which has given rise to a serious environmental issue. PVC wrap films suffer whitening on contact with boiling water. PVDC wrap films undergo considerable shrinkage on heating so that they can tear in microwave cooking. PE wrap films have insufficient heat resistance so that they can break due to melting or fusion to each other or melt to adhere to a container in microwave cooking. It has been proposed to use PP as a film material free of these problems. However, the state-of-the-art PP wrap films lack cling to a container or self-cling and also have unsatisfactory cutting properties.

It has been proposed to add a tackifier such as polybutene into PP wrap films to impart cling or to stretch the film to improve cutting properties. For example, JP-A-58-65632 discloses a technique for providing a food wrap film having improved self-cling, heat resistance, transparency and cutting properties, in which a polypropylene resin composition is stretched at least uniaxially to an areal stretch ratio of 1.3 or more at a temperature higher than the glass transition point by more than 30° C. The compounding additives referred to in the disclosure are only heat stabilizers and antistatic agents, and one cannot tell how these additives are influential on self-cling or transparency.

JP-B-2-14935 teaches a method for providing a wrap film with improved self-cling, cutting properties and transparency, in which a film of a polypropylene resin composition containing a tackifier having been stretched at least transversely is subjected to surface oxidation and then heat treatment at a temperature not lower than 50° C. and not higher than the crystal melting point, and, after winding in roll form, aged at 60 to 120° C. for 30 minutes or longer. According to this technique, the treatments make the tackifier bleed uniformly, which is taken advantage of to develop self-cling and transparency. However, the wrap film obtained by this method is still unsatisfactory in intimate contact (self-cling) and unwinding properties (ease of feed from a box in which a roll of the film is contained).

Apart from the performance as a wrapping material, chlorine-free wrap films mainly comprising polyethylene resins have been developed to solve the problem of dioxin generation from post consumer plastic films. However, having poor cutting properties and low heat resistance, many of the PE wrap films currently available do not command general consumer acceptance.

In order to improve cutting properties and heat resistance, multilayer wrap films mainly comprising various chlorine-free polyamide resins or polyester resins have been suggested. For example, JP-A-8-80600 discloses a laminate wrap film excellent in cutting properties, antifog properties, transparency, and heat resistance which comprises polypropylene resin surface layers and a polyamide resin intermediate layer. JP-A-5-116262 discloses a laminate wrap film excellent in cutting properties, heat resistance, transparency and environmental friendliness which comprises a polypropylene as an outer layer and an inner layer and a polyester resin as an intermediate layer.

The wrap films having a multilayer structure have been succeeding in improving cutting properties and heat resistance but still have room for improvement on workability and economy in the production. That is, a laminate wrap film having a polyamide resin or a polyester resin as an intermediate layer incurs a material cost increase because these resin materials are more expensive than polypropylene resins. In industrial production, these resins are liable to soil a die for forming a multilayer sheet. The laminate should be provided with an adhesive layer for preventing delamination, and a stretching machine also requires a contrivance for preventing delamination. Post-industrial scrap generated from residuals, such as trimmings and slitting loss, of such films comprising different resin compositions are difficult to reclaim.

Thus, laminate wrap films whose surface layers and intermediate layer have different resin compositions cannot be seen as satisfactory from the aspect of workability and economy in the production. It has therefore been keenly demanded to develop an inexpensive multilayer film which can be produced economically and with good workability.

SUMMARY OF THE INVENTION

An object of the present invention is to provide a wrap film which clings to not only glassware but containers having a relatively rough surface, such as stainless steel containers, with good contact such that a liquid in a container may not leak or spill, good cutting properties even with a saw blade fitted to a paperboard box in which a roll of wrap film for domestic use is put, and sufficient heat resistance even when used for cooking, e.g., in a microwave.

Another object is to provide a wrap film which has satisfactory unwinding properties, high tear resistance, satisfactory cutting properties, transparency, and safety to a human body and the environment.

Still another object is to provide a multilayer film which has a wide freedom of choice of resin materials, can be produced with excellent workability and economy, and is suitable as a household wrap film.

The inventors of the present invention have conducted extensive investigations to accomplish the above objects. The inventors have found as a result that simultaneous biaxial stretching of a multilayer film comprising a specific polypropylene resin as a main component and polybutene and/or polyisobutylene as a contact improving agent gives a multilayer film which is excellent in unwinding properties, cutting properties, contact and heat resistance, generates a reduced amount of harmful components on combustion, is produced with high productivity and good economy, and is fit for use as a wrap film for domestic use. The inventors have also found that a simultaneously biaxially stretched multilayer film having a surface layer mainly comprising a polypropylene resin and having a specific elongation at break and a specific tensile modulus is excellent in unwinding properties, cutting properties, contact and heat resistance, generates a reduced amount of harmful components on combustion, is produced with high productivity and good economy, and is fit for use as a wrap film for domestic use, and the like.

The present invention accomplishes the above objects by providing a wrap film comprising a thermoplastic resin composition and having an elongation at break in the longitudinal direction of less than 100% and a strength at 5% elongation in the longitudinal direction of 150 cN/10 mm or less (hereinafter referred to as a first aspect).

The present invention accomplishes the above objects by providing a wrap film which is a stretched film of a polypropylene resin composition comprising (A) a polypropylene resin, (B) a tackifier comprising a hydrocarbon having a number average molecular weight of 300 to 3000, (C) a nonionic surface active agent having an HLB value of 3.5 to 8, and (D) a nonionic surface active agent or fat and oil having a smaller HLB value than component (C) (hereinafter referred to as a second aspect).

The present invention accomplishes the above objects by providing a biaxially stretched polypropylene multilayer film obtained by simultaneous biaxial stretching of a sheet having at least layer A, layer B and layer C in this order, wherein said layer A is made of a resin composition comprising a polypropylene resin and 1 to 15 parts by weight of at least one of polybutene and polyisobutylene per 100 parts by weight of the polypropylene resin, said layer B is made of a resin composition comprising a polypropylene resin and 1 to 20 parts by weight of at least one of polybutene and polyisobutylene per 100 parts by weight of the polypropylene resin, said layer C is made of a resin composition comprising a polypropylene resin and 1 to 15 parts by weight of polybutene per 100 parts by weight of the polypropylene resin, said polypropylene resins used in said layers A, B and C independently have a melt flow rate of 0.5 to 15 g/10 min at 230° C., the DSC peak melting temperature of said resin composition of said layer B exceeds those of said resin compositions of said layers A and C, and the stretch ratios of said sheet in the machine direction and the transverse direction independently range from 3 to 7 (hereinafter referred to as a third aspect).

The present invention also accomplishes the above objects by providing a biaxially stretched polyolefin multilayer film for wrapping which is obtained by simultaneous biaxial stretching of a sheet having at least layer A', layer B' and layer C' in this order, wherein said stretched film has an elongation at break of 120% or less in both the machine direction and the transverse direction as measured according to JIS Z1712, a tensile modulus of 150 to 450 MPa in both the machine direction and the transverse direction as measured according to JIS Z1712, and a thickness of 8 to 15 $\mu$m, said layers A' and C', which are surface layers, both have a polypropylene resin content of 60% by weight or more, and said layer B', which is an intermediate layer, is made of a polyolefin resin or a polyolefin resin mixture (hereinafter referred to as a fourth aspect).

BRIEF DESCRIPTION OF THE DRAWING

The present invention will be more particularly described with reference to the accompanying drawing, in which.

DETAILED DESCRIPTION OF THE PREFERRED EMBODIMENTS

Figure 1:
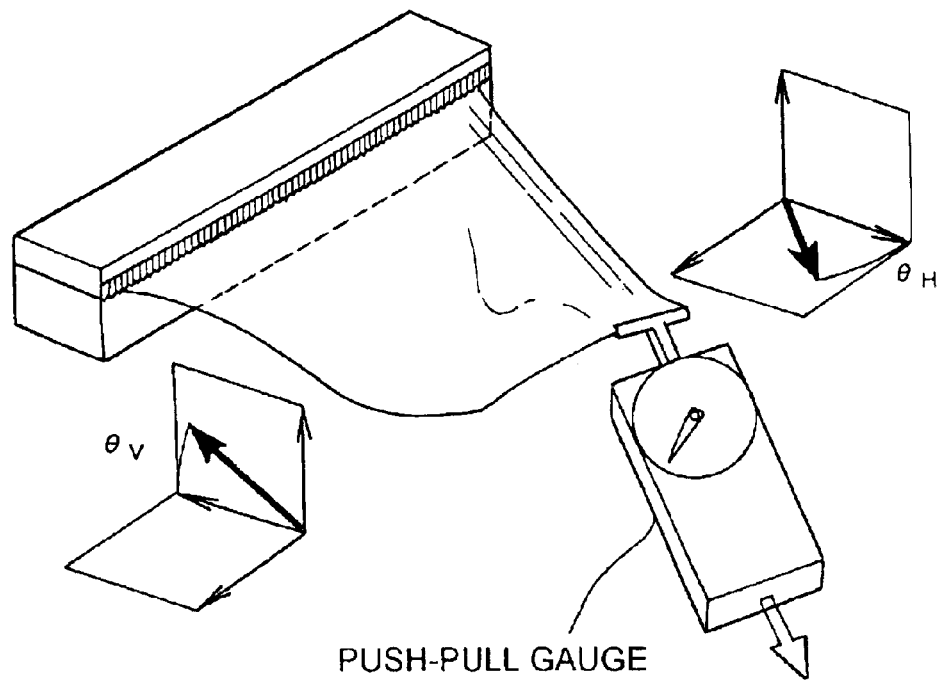
FIG. 1 schematically illustrates a method of measuring the force required for cutting a wrap film.

The wrap film according to the first aspect of the present invention will be described. The wrap film of the first aspect is made of a thermoplastic resin composition. The thermoplastic resin composition is a mixture of several kinds of resins selected to satisfy physical properties requirements for use as a wrap film. The plurality of the resins may be blended to provide a single layer film or may be used separately to make a laminate film.

Basic requirements for use as wrap film include safety for allowing application to food wrapping, heat resistance for allowing use in microwave cooking, barrier properties for preventing permeation of liquid, and see-through transparency for allowing the contents to be seen through. Resins that can be used to meet these requirements include polypropylene, polyethylene, polyvinyl chloride, polyvinylidene chloride, nylon, polystyrene, polyester, and polyvinyl alcohol, each of which may be a modified resin or a copolymer resin.

It is important for wrap film to have flexibility so as to be conformed to any shape of an object to be wrapped, such as a container. A hard film would not be conformed to the shape of a container or, if once conformed, it would not keep close contact with the container, separating from the container because of its restoring force. A hard film could be made conformable to the shape of a container by increasing the clinging properties, but such is not a practical solution because the film would have considerable difficulty in being unwound. Accordingly, the inventors have noted that increased flexibility of a film would be effective in controlling cling on the level that does not hinder ease of unwinding and sufficiently improving the contact.

In order to secure sufficient conformability to any shape of a container, it turned out that the wrap film of the first aspect should have a longitudinal direction strength at 5% elongation of 150 cN/10 mm or less. A film with such a strength at 5% elongation, being so soft, tends to be extended with a small force and have poor cutting properties with a saw blade. Then, in the present invention, satisfactory saw blade cutting properties are secured by controlling the longitudinal elongation at break within a range less than 100%. Thus, the wrap film of the first aspect satisfies both flexibility and saw blade cutting properties which are conflicting with each other.

The elongation at break is preferably 10% or more and less than 100%, still preferably 20 to 90%, particularly preferably 20 to 80%. The strength at 5elongation is preferably 10 to 150 cN/10 mm, still preferably 20 to 120 cN/10 mm particularly preferably 20 to 100 cN/10 mm. The elongation at break at 5% elongation falling within these preferred ranges, the wrap film will exhibit close contact and saw blade cutting properties in better balance.

For obtaining a further improved balance of contact and saw blade cutting properties, it is preferred for the wrap film to satisfy the above-described conditions of elongation at break and strength at 5% elongation in not only the longitudinal direction but the width direction.

The elongation at break and the strength at 5% elongation as used in the first aspect of the present invention are measured in accordance with JIS K7127.

A wrap film having a strength at 5% elongation of 150 cN/10 mm or less can be obtained by using resins whose strength at 5% elongation is 150 cN/10 mm or less. Other resins are also usable, in which case the strength at 5% elongation is adjusted by blending with plasticizing substances or soft resins such as rubber. Copolymer resins comprising two or more monomer units are also useful. Suitable rubbers that can be blended include thermoplastic elastomers, such as styrene elastomers, vinyl chloride elastomers, olefin elastomers, polyester elastomers, polyamide elastomers, and urethane elastomers, from among which a choice is made taking into consideration compatibility with the main resin.

A wrap film having an elongation at break of less than 100% can be obtained by stretching a single layer film or a multilayer film or by using a resin of small extensibility to make an intermediate layer of a multilayer film. In general, a resin which is not stretchy (having small extensibility) tends to be not flexible. Therefore, in fabricating a multilayer film having a nonflexible resin layer as an intermediate layer and yet exhibiting flexibility as a wrap film, it is necessary to make the surface layers of sufficiently flexible resins to minimize the influence of the intermediate layer. Alternatively, the multilayer film can have an intermediate layer made of a flexible resin and having an increased thickness sandwiched in surface layers made of resins having small extensibility and reduced thicknesses.

Film thickness is greatly influential on film flexibility. A resin having higher flexibility will secure more intimate contact even with an increased thickness. For practical use, a film thickness of about 7 to 15 µm is suitable for providing ease of use and wrapping performance properties.

From various considerations, such as practical application and economy, the wrap film of the first aspect is preferably made of a resin composition mainly comprising a polypropylene resin. The polypropylene resin includes a propylene homopolymer and copolymers of propylene and other α-olefins, particularly those having 4 or less carbon atoms. The propylene homopolymer includes isotactic polypropylene, syndiotactic polypropylene, and atactic polypropylene, with isotactic polypropylene being preferred for its structure. The propylene copolymers include random copolymers, block copolymers, and graft copolymers, with random copolymers being preferred. From the viewpoint of flexibility, the copolymer of propylene and other α-olefins, particularly those having 4 or less carbon atoms, is preferably used as a polypropylene resin. An ethylene-propylene copolymer or an ethylene-propylene-butene copolymer is particularly preferred. It is unfavorable to merely increase the α-olefin content in the copolymer for increasing the flexibility. An increased α-olefin content is liable to hinder stretching operation for improving cutting properties or reduce the melting point, which results in reduced heat resistance in microwave application. In this regard, a preferred α-olefin content in the polypropylene copolymer is less than 20% by weight, particularly 4 to 15% by weight.

It tends to be difficult to obtain sufficient flexibility solely with a polypropylene resin having the above-specified α-olefin content. Then, it is desirable that the resin composition further comprise a resin having a flexural modulus of 100 MPa or less, particularly 1 to 50 MPa (hereinafter referred to as a flexibility-imparting resin). The flexural modulus is measured in accordance with ASTM D790.

An ethylene-α-olefin copolymer having 4 or greater carbon atoms in the α-olefin unit is a favorable flexibility-imparting resin. It is capable of making the polypropylene resin film flexible without impairing stretchability and heat resistance and also improving the balance of moldability, heat resistance, flexibility and transparency.

The α-olefin having 4 or more carbon atoms include butene, hexene, methylpentene and octene. Copolymerization of ethylene with these α-olefins provides highly flexible resins. The higher the α-olefin content, the more flexible the resulting copolymer resin. A preferred α-olefin content in the ethylene-α-olefin copolymer is 10% by weight or more, particularly 15 to 40% by weight. A preferred ethylene content in the copolymer is 50% by weight or more, particularly 65 to 80% by weight. An ethylene-α-olefin copolymer having such a composition is compatible with the polypropylene resin to improve flexibility without ruining moldability, transparency and heat resistance.

In view of flexibility and moldability, the resin composition preferably comprises 50 to 80% by weight, particularly 50 to 70% by weight, of the polypropylene resin and 20 to 50% by weight, particularly 30 to 50% by weight, of the ethylene-α-olefin copolymer. This blending formulation will hereinafter be referred to as formulation A.

In addition to the ethylene-α-olefin copolymer, elastomer components are also preferred flexibility-imparting resins. Useful elastomers include styrene elastomers and olefin elastomers, such as ethylene-propylene rubber and ethylene-propylene-diene rubber. Blending the polypropylene resin with these elastomer components sometimes results in impairment of moldability and flexibility depending on the blending uniformity. To blend uniformly, it is advisable to dispersively copolymerize the elastomer component in the stage of preparing the polypropylene resin to make the elastomer be finely dispersed. A resin composition thus prepared possesses both moldability and flexibility. For example, a resin composition made up of a polypropylene resin and rubber which is prepared by the Catalloy process established by Sun Allomer Co., Ltd. possesses moldability, heat resistance and flexibility and is suited for use in the present invention.

In view of flexibility and moldability, the resin composition preferably comprises 70 to 30% by weight, particularly 60 to 40% by weight, of the polypropylene resin and 30 to 70% by weight, particularly 40 to 60% by weight, of the elastomer component. This blending formulation will hereinafter be referred to as formulation B.

The above-described ethylene-α-olefin copolymer and the above-described elastomer component can be used in combination as flexibility-imparting resins. In particular a combination of the ethylene-α-olefin copolymer and the ethylene-propylene rubber is a preferred combination for providing further improved flexibility without impairing the moldability. In this case, the resin composition preferably comprises 20 to 60% by weight, particularly 30 to 50% by weight, of the polypropylene resin; 8 to 32% by weight, particularly 12 to 25% by weight, of the ethylene-α-olefin copolymer; and 24 to 50% by weight, particularly 30 to 45% by weight, of the ethylene-propylene rubber. This blending formulation will hereinafter be referred to as formulation (C).

Blending the elastomer component or the ethylene-α-olefin copolymer into the polypropylene resin sometimes results in film surface roughening even where the former is finely dispersed in the latter, which can result in deterioration of cling or clarity. This tendency is conspicuous in using the elastomer component. Then, it is a preferred embodiment for the wrap film of the first aspect to have a multilayer structure having an intermediate layer and first and second surface layers provided on the intermediate layer, in which the intermediate layer is made of a resin composition comprising a polypropylene resin and at least one of the ethylene-α-olefin copolymer and the elastomer component (e.g., ethylene-propylene rubber), and the first and second surface layers are made of a polypropylene resin. Having a highly smooth polypropylene resin layer on both sides, the wrap film according to this embodiment has improved transparency and cling.

In the above embodiment, it is preferred for transparency, flexibility and moldability that the first and the second surface layers be made of a polypropylene resin having a flexural modulus of 500 MPa or more, particularly 500 to 1000 MPa, and that the intermediate layer be made of a thermoplastic resin composition having a flexural modulus of 200 MPa or less, particularly 10 to 100 MPa and comprising a polypropylene resin, or a thermoplastic resin composition comprising a polypropylene resin and the above-described flexibility-imparting resin having a flexural modulus of 100 MPa or less, particularly 1 to 50 MPa.

Where the intermediate layer comprises a polypropylene resin and the ethylene-α-olefin copolymer, the thermoplastic resin composition therefor preferably comprises 40 to 80% by weight, particularly 40 to 60% by weight, of the polypropylene resin, and 20 to 60% by weight, particularly 40 to 60% by weight, of the ethylene-α-olefin copolymer to secure flexibility and moldability. In this case, the ratio of the polypropylene resin and the ethylene-α-olefin copolymer in the whole wrap film is preferably within the formulation A.

Where the intermediate layer comprises a polypropylene resin and the elastomer component, especially ethylene-propylene rubber, the thermoplastic resin composition therefor preferably comprises 30 to 70% by weight, particularly 40 to 60% by weight, of the polypropylene resin, and 30 to 70% by weight, particularly 40 to 60% by weight, of the ethylene-propylene rubber to secure flexibility and moldability. In this case, the ratio of the polypropylene resin and the ethylene-propylene rubber in the whole wrap film is preferably within the formulation B.

Where the intermediate layer comprises a polypropylene resin, the ethylene-α-olefin copolymer and the elastomer component, especially ethylene-propylene rubber, the thermoplastic resin composition therefor preferably comprises 18 to 50% by weight, particularly 30 to 50% by weight, of the polypropylene resin, 10 to 40% by weight, particularly 15 to 30% by weight, of the ethylene-α-olefin copolymer, and 30 to 70% by weight, particularly 30 to 50% by weight, of the ethylene-propylene rubber. In this case, the ratio of the polypropylene resin, the ethylene-α-olefin copolymer and the ethylene-propylene rubber in the whole wrap film is preferably within the formulation C.

With flexibility and moldability being taken into consideration, a preferred thickness ratio of the first surface layer:intermediate layer:second surface layer is 1:4:1 to 1:10:1, particularly 1:6:1 to 1:10:1.

The intermediate layer can also be made of an ethylene-α-olefin copolymer having a flexural modulus of 100 MPa or less. The ethylene-α-olefin copolymer used here has a density of 0.860 to 0.905 g/cm$^3$ and an α-olefin content of 10% by weight or more. It is preferred that such an ethylene-α-olefin copolymer film be crosslinked by, for example, electron radiation followed by stretching. In view of flexibility and moldability, the resin composition making up the whole wrap film preferably comprises 30 to 60% by weight, particularly 35 to 50% by weight, of the polypropylene resin and 70 to 40% by weight, particularly 75 to 50% by weight, of the ethylene-α-olefin copolymer.

Where the intermediate layer is made of the ethylene-α-olefin copolymer, the ethylene-α-olefin copolymer is required to have melt tension. To meet the requirement, it is preferred for the ethylene-α-olefin copolymer to comprise molecules having a relatively large molecular weight. From this viewpoint, ethylene-α-olefin copolymers that are prepared by the vapor phase process of Union Carbide Corp. which have a density of 0.860 to 0.905 g/cm$^3$ are preferably used. Those having a density of 0.865 to 0.905 g/cm$^3$ and an α-olefin content of 10 to 30% by weight can be used in arbitrary combinations. In order to obtain stable moldability, ethylene-α-olefin copolymers having a density of 0.885 to 0.905 g/cm$^3$ and an α-olefin content of 10 to 20% by weight are preferred.

Where the intermediate layer is made of the ethylene-α-olefin copolymer, a preferred thickness ratio of the first surface layer:intermediate layer:second surface layer is 1:2:1 to 1:4:1 for obtaining both moldability and flexibility.

A film made of the above-described various resin compositions can be stretched to have a reduced elongation at break and thereby to give the film cutting properties with a saw blade. Biaxial stretching is desirable because uniaxial stretching results in anisotropy of mechanical properties. Biaxial stretching is preferably carried out by simultaneous stretching. Stretching at a stretch ratio of 4 to 6 in the MD and the TD provides a stretched film which has controlled extensibility to facilitate cutting with a saw blade and well-balanced mechanical strength.

There are several methods for improving clinging properties of the wrap film of the first aspect. One of the methods comprises adding 1 to 8 parts by weight, particularly 2 to 4 parts by weight, of a tackifier comprising a saturated hydrocarbon having a molecular weight of 300 to 2500 which is liquid at room temperature and 0.1 to 5 parts by weight, particularly 1 to 3 parts by weight, of a glycerol or polyglycerol fatty acid ester having at least one hydroxyl group per molecule to 100 parts by weight of the polypropylene resin composition for making the wrap film.

The tackifier is preferably polybutene having a number average molecular weight of 300 to 4000, particularly 600 to 1500, with which a good balance between cling and ease of unwinding is obtained.

Other tackifiers that are preferably used include polyterpene resins, $C_5$ petroleum resins, $C_9$ petroleum resins, dicyclopentadiene-based petroleum resins, rosin-based petroleum resins, and alicyclic saturated hydrocarbon resins.

The glycerol or polyglycerol fatty acid ester having at least one hydroxyl group per molecule includes glycerol monofatty acid esters and diglycerol monofatty acid esters. The fatty acid includes caprylic acid, capric acid, lauric acid, myristic acid, palmitic acid, stearic acid, and oleic acid. Preferred of these fatty acids are those which are solid at room temperature. Fatty acids in the glycerol monofatty acid esters include capric acid, lauric acid, myristic acid, palmitic acid, stearic acid, and oleic acid, and those in the diglycerol monofatty acid esters include lauric acid, myristic acid, palmitic acid, and stearic acid.

The glycerol or polyglycerol fatty acid esters further include modified ones. Modified glycerol fatty acid esters, for example, include glycerol diacetylmono-oleate, glycerol diacetylmonolaurate, glycerol diacetylmonopalmitate, glycerol monoacetyldioleate, glycerol monoacetyldilaurate, glycerol monoacetylmonopalmitate, glycerol monoacetylmono-oleate, glycerol monoacetylmonolaurate, and glycerol monoacetylmonocaprylate.

The glycerol or polyglycerol fatty acid ester may be used in combination with a full ester. Useful full esters include animal and vegetable fats and oils, such as olive oil, rapeseed oil, palm oil, palm kernel oil, coconut oil, castor oil, sesame oil, cotton seed oil, peanut oil, corn oil, soybean oil, sunflower oil, safflower oil, linseed oil, beef tallow, and lard; diglycerol tetrafatty acid esters, diglycerol trifatty acid esters, tetraglycerol pentafatty acid esters, pentaglycerol hexafatty acid esters, hexaglycerol pentafatty acid esters, and decaglycerol decafatty acid esters. Fatty acids in these polyglycerol fatty acid esters chiefly include oleic acid and stearic acid.

If desired, the wrap film of the first aspect can contain additives for improving cling and ease of unwinding. Useful additives include fatty acids, aliphatic alcohols, fatty acid amides, nonionic surface active agents, aliphatic hydrocarbons, polyglycols, monohydric or polyhydric alcohol fatty acid esters, triglycerides, silicone oil, phthalic esters, aliphatic dibasic acid esters, phosphoric esters, acetyl triethyl citrate, acetyl tributyl citrate, epoxidized resins, and epoxidized fatty acid esters. Representative examples are glycerol, acetylated monoglycerides, glycerol fatty acid esters, polyglycerol fatty acid esters, sorbitan fatty acid esters, propylene glycol fatty acid esters, sucrose fatty acid esters, mono-, di- or tristearyl citrate, pentaerythritol fatty acid esters, trimethylpropane fatty acid esters, polyoxyethylene glycerol fatty acid esters, polyoxyethylene sorbitan fatty acid esters, polyethylene glycol fatty acid esters, polypropylene glycol fatty acid esters, polybutene, liquid paraffin, chlorinated paraffin, polyterpene resins, $C_5$ petroleum resins, $C_9$ petroleum resins, dicyclopentadiene-based petroleum resins, rosin-based petroleum resins, and alicyclic saturated hydrocarbon resins.

The kinds and amounts of the additives are controlled so as to bleed uniformly on the film surface. For the same purpose, the film containing the additives can be subjected to aging at 40° C. for one day or surface oxidation treatment, specifically a corona discharge treatment.

The second to fourth aspects of the present invention are then described. The explanation given to the first aspect applies to the second to fourth ones where not described otherwise.

The wrap film according to the second aspect is a stretched film of a polypropylene resin composition comprising (A) a polypropylene resin, (B) a tackifier comprising a hydrocarbon having a number average molecular weight of 300 to 3000, (C) a nonionic surface active agent having an HLB value of 3.5 to 8, and (D) a nonionic surface active agent or fat and oil having a smaller HLB value than component (C).

In the second aspect, a film made of a polypropylene resin composition is stretched to provide a wrap film with improve cutting properties. However, stretching of a polypropylene resin film involves a disadvantage that the polypropylene resin is crystallized to hinder additives contained therein, such as a tackifier, from bleeding out. It may follow that the additives are prevented from exerting their effects to the full in achieving desired close contact and unwinding properties. There is another disadvantage that the additives bleed non-uniformly and tend to aggregate into balls on the film surface, which can impair transparency or gloss of the film. The inventors have studied to seek a solution to these problems and found that a wrap film showing desired contact, ease of unwinding and the like is obtained by using the above-described components (B) to (D) as additives for a polypropylene resin as component (A). These components will be described below.

The polypropylene resin as component (A) includes a propylene homopolymer and copolymers of propylene and copolymerizable monomers (comonomers). For achieving improvements in contact, softness, heat resistance, and so forth, the polypropylene resin is preferably a copolymer comprising propylene and ethylene or other α-olefins having 4 to 8 carbon atoms. From the viewpoint of improvement in contact, softness, heat resistance, etc. the copolymer preferably has a propylene content of 88 to 99% by weight, particularly 92 to 97% by weight, and a comonomer content of 1 to 12% by weight, particularly 3 to 8% by weight.

Component (A) preferably has a weight average molecular weight of $2\times10^5$ to $8\times10^5$, particularly $4\times10^5$ to $8\times10^5$, from the standpoint of softness and contact.

Component (A) has a density of 0.9 g/cm$^3$, which is not subject to variation according to the content of the comonomer, such as ethylene or a $C_{4-8}$ α-olefin. Component (A) preferably has a melt index (MI) of 0.4 to 6 g/10 min, particularly 0.5 to 5.5 g/10 min, which ensures ease in producing a wrap film by means of a tubular method biaxial stretching machine.

The tackifier as component (B) is contributory to improvement on intimate contact of the wrap film. Hydrocarbons having a number average molecular weight of 300 to 3000, preferably 500 to 2500, can be used as component (B). With a number average molecular weight smaller than 300, the property for close contact hardly develops. If it exceeds 3000, the film is so clinging to reduce unwinding properties.

The tackifier includes polybutene, polyterpene resins, $C_5$ petroleum resins, $C_9$ petroleum resins, dicyclopentadiene-based petroleum resins, rosin-based petroleum resins, and alicyclic saturated hydrocarbon resins. These resins can be used either individually or as a combination of two or more thereof. In particular, polybutene, polyterpene resins and alicyclic saturated hydrocarbon resins are preferred for improving contact. Polybutene is the most preferred.

In view of close contact and unwinding properties, component (B) is preferably used in an amount of 1 to 8 parts by weight, particularly 2 to 7 parts by weight, per 100 parts by weight of component (A).

Component (C), which contributes to ease of unwinding, is a nonionic surface active agent having an HLB value of 3.5 to 8, preferably 4 to 8, still preferably 4.2 to 7.9. If the HLB value is smaller than 3.5, the surface active agent hardly bleeds out, resulting in insufficient unwinding properties. At an HLB value of greater than 8, the difference in HLB between components (C) and (D) becomes too large for component (D) to mediate between components (B) and (C). As a result, component (B) hardly bleeds out, resulting in insufficient contact. The terminology "HLB value" as used herein denotes a value calculated according to the Griffin's empirical formula: HLB value=20(1-SV/NV), wherein SV is a saponification value of an ester, which is the amount (mg/g) of potassium hydroxide (KOH) necessary to saponify 1 g of a fatty acid ester; and NV is a neutralization value, which is the amount (mg/g) of KOH necessary to neutralize 1 g of a fatty acid used in the fatty acid ester.

Component (C) is preferably solid at room temperature (23° C., hereinafter the same). Component (C) which is liquid at room temperature tends to fail to develop sufficient improving effect on unwinding properties even though it bleeds out.

Component (C) includes a glycerol fatty acid ester having at least one hydroxyl group per molecule, a polyglycerol fatty acid ester having at least one hydroxyl group per molecule, and a mixture thereof. These fatty acid esters are easy to control the HLB value. Many of these glycerides are of food additive grade, which are preferred for safety to a human body. Nonionic surface active agents other than the fatty acid esters are useful as well. Such nonionic surface active agents include sorbitan fatty acid esters, propylene glycol fatty acid esters and sucrose fatty acid esters, each of which contains at least one hydroxyl group in the molecule thereof.

The polyglycerol of the polyglycerol fatty acid esters is preferably diglycerol, which is inexpensive.

The fatty acids in the fatty acid esters preferably include those having 8 to 18 carbon atoms for their inexpensiveness and safety admitted as food additives. Fatty acids in the glycerol fatty acid esters include capric acid, lauric acid, myristic acid, palmitic acid, stearic acid, and oleic acid, and those in the polyglycerol fatty acid esters include lauric acid, myristic acid, palmitic acid, and stearic acid.

It is preferred for ease of adjusting the HLB value within the above-specified range that the glycerol fatty acid esters have one acyl group per molecule. For the same reason, it is preferred for the polyglycerol fatty acid esters, e.g., diglycerol fatty acid esters, to have one acyl group per molecule.

Particularly preferred fatty acid esters as component (C) are glycerides such as glycerol mono-oleate and glycerol monolaurate; and polyglycerides such as diglycerol monomyristate and diglycerol monostearate.

Component (C) is preferably used in an amount of 0.1 to 2 parts by weight, particularly 0.3 to 1 part by weight, per 100 parts by weight of component (A), which range is desirable for preventing whitening of the film surface and for improving transparency and unwinding properties.

The content of component (C) is related to the content of component (B). Specifically, component (C) is preferably used in an amount of 3 to 50 parts by weight, particularly 5 to 40 parts by weight, per 100 parts by weight of component (B) to facilitate component (B)'s bleeding to bring improved contact.

Component (D) is a nonionic surface active agent or fat and oil having a smaller HLB value than component (C). Component (D) serves to mediate between components (B) and (C), making a contribution to component (B)'s bleeding out.

The HLB value of component (D), besides being smaller than the HLB value of component (C), is preferably 1.2 or greater and smaller than 3.5, still preferably from 1.5 to 3, which is desirable for helping component (B) bleed out to bring about further improved contact.

Suitable nonionic surface active agents as component (D) include diglycerol trifatty acid esters, tetraglycerol pentafatty acid esters, pentaglycerol hexafatty acid esters, hexaglycerol pentafatty acid esters, and decaglycerol decafatty acid esters. Suitable examples of fats and oils as component (D) include animal and vegetable fats and oils, such as olive oil, rapeseed oil, palm oil, palm kernel oil, coconut oil, castor oil, sesame oil, cotton seed oil, peanut oil, corn oil, soybean oil, sunflower oil, safflower oil, linseed oil, beef tallow, and lard; glycerol trifatty acid esters, and diglycerol tetrafatty acid esters. Fatty acids in the nonionic surface active agents or fats and oils chiefly include oleic acid and stearic acid.

It is preferred to use as component (D) glycerol and/or polyglycerol fats and oils, namely, glycerol and/or polyglycerol full esters, having at least two $C_{8-18}$ acyl groups per molecule, which is advisable for ease of HLB control and safety admitted as food additives. The polyglycerol of the polyglycerol full esters is preferably diglycerol, which is inexpensive.

Particularly preferred substances as component (D) include decaglycerol decaoleate, diglycerol tetraoleate, diglycerol tetralaurate, olive oil, and castor oil. Diglycerol tetraoleate, olive oil, and castor oil are especially preferred.

Component (D) is preferably used in an amount of 0.1 to 3 parts by weight, particularly 0.3 to 2 parts by weight, per 100 parts by weight of component (A) to help component (B) bleed out and to improve contact and unwinding properties.

The content of component (D) is related to the content of component (B). Specifically, component (D) is preferably used in an amount of 10 to 70 parts by weight, particularly 10 to 50 parts by weight, per 100 parts by weight of component (B) to facilitate component (B)'s bleeding out to bring improved contact.

It is preferred for the polypropylene resin composition used in the second aspect to further comprise (E) a glycerol fatty acid ester represented by formula (I) shown below to prevent irregular reflection of light thereby maintaining transparency and gloss of the film.

wherein two out of $R^1$, $R^2$, and $R^3$ each represent an acyl group having 2 to 6 carbon atoms, with the rest representing an acyl group having 2 to 22 carbon atoms.

In formula (I), the two acyl groups having 2 to 6 carbon atoms may be either the same or different. A preferred carbon atom number of these acyl groups is 2 to 4. The other acyl group containing 2 to 22 carbon atoms preferably has a carbon atom number of 8 to 18, particularly 12 to 18.

It is preferred that component (E) be liquid at room temperature, whereby component (E) easily bleeds out to effectively prevent irregular reflection of light on the film surface.

Examples of component (E) are glycerol diacetylmonolaurate, glycerol diacetylmono-oleate, and glycerol diacetylmonopalmitate. Glycerol diacetylmonolaurate and glycerol diacetylmono-oleate are particularly preferred; for they bleed out to form a uniform film on the wrap film surface to prevent irregular reflection of light and thereby to maintain transparency.

Component (E) is preferably used in an amount of 0.1 to 3 parts by weight, particularly 0.5 to 2 parts by weight, per 100 parts by weight of component (A) from the standpoint of preventing irregular reflection of light on the film surface and stickiness development due to excessive bleeding.

The content of component (E) is related to the content of component (B). Specifically, component (E) is preferably used in an amount of 10 to 70 parts by weight, particularly 15 to 50 parts by weight, per 100 parts by weight of component (B) to form a uniform film of component (E) even when component (B) bleeds out non-uniformly.

If desired, the polypropylene resin composition used in the second aspect can further comprise various additives in addition to the components (A) to (E) so as to improve various performance properties of wrap film. Such additives typically include antioxidants for preventing thermal deterioration in film formation. The additives such as antioxidants are preferably used in an amount of 0.1 to 1% by weight, particularly 0.1 to 0.5% by weight, based on the total polypropylene composition.

The wrap film of the second aspect is obtained by melt-kneading the polypropylene resin composition in, for example, an extruder with a circular die, extruding the molten resin composition through the circular die, and stretching the extruded tubing at least uniaxially, preferably biaxially. In biaxial stretching, a preferred stretch ratio for securing satisfactory cutting properties is 3 to 6 in each of the MD and the TD.

The stretched film can be aged at 30 to 50° C. for 2 to 7 days or be subjected to surface oxidation treatment, specifically a corona discharge treatment, thereby to improve uniformity of the bleeding of the additives on the film surface.

The multilayer film according to the third aspect of the present invention has at least layer A, layer B and layer C in this order. The balance between contact and heat resistance taken into consideration, each of the layers constituting the multilayer film comprises a polypropylene resin.

The polypropylene resins used in the constituent layers independently have a melt flow rate (hereinafter abbreviated as MFR) of 0.5 to 15 g/10 min, particularly 1.5 to 10 g/10 min, at 230° C. If a polypropylene resin having an MFR exceeding 15 g/10 min is used, the resulting multilayer sheet to be stretched has poor thickness uniformity. A polypropylene resin having an MFR smaller than 0.5 g/10 min imposes a great load on an extruder, making it difficult to form a multilayer sheet to be stretched. MFR is measured in accordance with JIS K6758 under conditions of 230° C. and a 2.16 kg load with a commercially available measuring instrument.

The resin composition making up each layer is selected so that the DSC peak melting temperature of the resin composition of the layer B may exceed those of the resin compositions of the layer A and the layer C. With this condition being fulfilled, polybutene or polyisobutylene used as a contact improving agent easily migrate to the layers A and C. Where a glycerol fatty acid ester, which is a plasticizer, and the like are incorporated into the layer B, such a plasticizer also easily migrates to the layers A and C. The DSC peak melting temperatures of the resin compositions are measured at a rate of temperature rise of 10° C./min.

While not limiting, the polypropylene resin used in the resin composition making the layer A is preferably an ethylene-propylene copolymer or an ethylene-propylene-butene copolymer. The resin composition comprises 1 to 15 parts, preferably 3 to 13 parts, by weight of polybutene and/or polyisobutylene per 100 parts by weight of the polypropylene resin. With the polybutene and/or polyisobutylene content of less than 1 part by weight, the film has insufficient contact. If the content exceeds 15 parts by weight, excessive bleeding develops stickiness and reduces the heat resistance.

The DSC peak melting temperature of the resin composition making the layer A is preferably 145° C. or lower, still preferably 135° C. or lower. Where the resin composition has too high a DSC peak melting temperature, the resin as a whole tends be too rigid to obtain sufficient contact as wrap film.

Similarly to the layer A, the polypropylene of the resin composition making the layer B is not particularly limited but is preferably an ethylene-propylene copolymer or an ethylene-propylene-butene copolymer. It is preferred for the resin composition to further comprise an amorphous polypropylene copolymer. The term "amorphous polypropylene copolymer" denotes a copolymer of propylene and ethylene and/or butene-1, typically including CAP resins available from Ube Industries, Ltd. and Catalloy resins available from Sun Allomer.

By incorporating an amorphous polypropylene copolymer having a Shore D hardness of 55 or less to the polypropylene resin of the layer B, the rigidity of the whole resin can be reduced, and the bleeding of polybutene and/or polyisobutylene is accelerated.

The amorphous polypropylene resin can be used in an arbitrary ratio to the polypropylene resin of the layer B. Taking expensiveness of the amorphous polypropylene resin compared with the polypropylene resin into consideration, a preferred content of the amorphous polypropylene resin is 50 parts by weight or less per 100 parts by weight of the polypropylene resin.

The resin composition making the layer B comprises 1 to 20 parts, preferably 5 to 15 parts, by weight of polybutene and/or polyisobutylene per 100 parts by weight of the polypropylene resin. With the polybutene and/or polyisobutylene content of less than 1 part by weight, the film has insufficient contact as wrap film. If the content exceeds 20 parts by weight, the polybutene and/or polyisobutylene excessively bleed out to produce unfavorable stickiness.

Where the DSC peak melting temperature of the resin composition making the layer B is too high, the resin as a whole tends be too rigid, and the polybutene and/or polyisobutylene become slow in bleeding. As a result, the resulting film tends to have poor contact. Accordingly, a preferred DSC peak melting temperature of that resin composition is 150° C. or lower.

It is preferred that the DSC peak melting temperature of the resin composition making the layer B be higher than those of the resin compositions making the layers A and C by at least 1° C. With this difference, polybutene or polyisobutylene, which are contact improving agents, or a glycerol fatty acid ester, which is a plasticizer, easily migrates to the layers A and C.

The polypropylene resin of the resin composition making the layer C is not particularly limited but is preferably an ethylene-propylene copolymer, an ethylene-propylene-butene copolymer or a mixture thereof. The resin composition comprises 1 to 15 parts, preferably 3 to 13 parts, by weight of polybutene as a contact improving agent per 100 parts by weight of the polypropylene resin. With the polybutene content of less than 1 part by weight, the film has insufficient contact. If the content exceeds 15 parts by weight, excess bleeding develops unfavorable stickiness, and the heat resistance reduces.

The weight ratio of the layer C to the total layers is preferably in a range of 5 to 30%. Where it exceeds 30%, bleeding of polybutene and/or polyisobutylene is retarded, which can result in insufficient contact as wrap film. Where it is less than 5%, bleeding tends to proceed too fast, which can result in stickiness of the multilayer film. Where, in particular, the multilayer sheet having the layers A, B and C in this order is prepared from a tubular sheet with the layer C inside, the above-specified weight ratio of the layer C secures the open nature of the tubular sheet in stretching and facilitates slitting the biaxially stretched tubular film.

The resin composition making the layer C should be designed to have a lower DSC peak melting temperature than the resin composition of the layer B so that the polybutene and/or polyisobutylene, which are contact improving agents, may bleed out moderately to provide a multilayer film showing satisfactory contact as wrap film.

If desired, the polypropylene resin constituting the layer A, B or C can contain plasticizers or anti-fogging agents, such as glycerol fatty acid esters, polyglycerol fatty acid esters, and sorbitan fatty acid esters. A combined use of polybutene or polyisobutylene as a contact improving agent and a glycerol fatty acid ester results in improved contact and improved unwinding properties. While not limiting, useful glycerol fatty acid esters preferably include monoglycerides, diglycerides, triglycerides, and acetylated monoglycerides, with diacetylated monoglycerides being particularly preferred. While not limiting, the glycerol fatty acid ester, if added, is preferably used in an amount of 0.2 to 5.0 parts by weight per 100 parts by weight of the polypropylene resin in view of the balance between unwinding properties and bleeding.

Useful polyglycerol fatty acid esters include, but are not limited to, diglycerol monolaurate, diglycerol monopalmitate, diglycerol mono-oleate, diglycerol monostearate, diglycerol dioleate, and triglycerol mono-oleate. Useful sorbitan fatty acid esters include sorbitan monolaurate (Span 20), sorbitan monopalmitate (Span 40), sorbitan monostearate (Span 60), and sorbitan mono-oleate (Span 80).

If desired, each layer may further contain additives commonly employed in the art, such as antistatic agents and antioxidants.

The multilayer film of the third aspect can be produced economically, namely, at low production cost since all the constituent layers mainly comprise a polypropylene resin. That is, post-industrial scrap, such as trimmings and slitting loss, generated in the site of manufacture can be effectively reused as a reclaim. The workability and economy of production are thus improved compared with conventional techniques. Since all the layers A, B and C mainly comprise a polypropylene resin, the residuals can be incorporated into each layer as a reclaim without influencing the quality of the resulting multilayer film. Where the reclaim is used not in the layers A or C but in the layer B, reduction in transparency can be minimized. Although a polypropylene resin is used in all the layers A, B and C, the multilayer film of the third aspect is equal in characteristics to conventional multilayer films having different resin compositions, securing equally satisfactory cutting properties, unwinding properties, and contact.

The multilayer film of the third aspect is a stretched film obtained by simultaneously stretching the multilayer sheet in the MD and TD each to a stretch ratio of from 3 to 7, preferably to an areal stretch ratio of 10 to 40. A multilayer film obtained by general sequential biaxial stretching using a tenter is extensible in the MD and shows poor cutting properties when cut with a saw blade provided on a paperboard box. A stretch ratio less than 3 in simultaneous biaxial stretching results in insufficient cutting properties. Stretching to a stretch ratio more than 7 is not economical, often causing film breakage. At an areal stretch ratio of 10 to 40, the stretched film has sufficient cutting properties, and stretching can be carried out economically without being accompanied by film breakage.

The multilayer film of the third aspect is obtained by simultaneous biaxial stretching of a multilayer sheet having the layers A, B and C in this order. The multilayer sheet to be stretched is preferably a tubular sheet, which is advantageous for securing workability in film production while retaining the film properties such as cutting properties. Simultaneous biaxial stretching can be carried out by a flat method and a tubular method. The flat method includes a tenter system, a tapered roll system, and an octopus system. The tubular method includes a static pressure system, a fluid pressure system, a liquid system, and a double bubble system. The multilayer film of the third aspect can be produced by any of these methods or systems. While not limiting, simultaneous biaxial stretching of a tubular sheet is preferably performed by a double bubble system in which an extruded and inflated (first bubble) tubular sheet is once quenched, reheated, and biaxially stretched by inflation (second bubble).

The multilayer film of the third aspect may be subjected to electron beam irradiation. Upon being irradiated with high energy rays, such as ultraviolet rays, electron beams, X-rays, α-rays, γ-rays, and neutron rays, in a conventional manner applied to multilayer films, the molecular chains of the polypropylene resin are severed, which further improves the cutting properties of the film. Electron irradiation may be effected either before or after the stretch. The exposed dose is not particularly limited but is suitably 5 Mrad or higher, particularly 10 Mrad or higher.

The multilayer film of the fourth aspect of the present invention is a biaxially stretched film having at least layer A', layer B' and layer C' in this order. Taking contact as a wrap film and heat resistance into consideration, both the surface layers (layers A' and C') comprise a polypropylene, and the intermediate layer (layer B') comprises a polyolefin resin. The terminology "polyolefin resin" as used herein is used to denote copolymers of ethylene and α-olefins having 3 or more carbon atoms and homopolymers of olefins having 2 or more carbon atoms. Suitable polyolefin resins include an ethylene-butene copolymer, an ethylene-propylene copolymer, an ethylene-hexene (methylpentene) copolymer, an ethylene-octene copolymer, polyethylene, polypropylene, and polybutene. Mixtures of these polyolefin resins, including polymer alloys obtained by multi-stage polymerization, are suitable as well. In particular, polyolefin elastomers having a rubber component dispersed therein, which are called thermoplastic olefins abbreviated as TPOs, and very-low-density polyethylene abbreviated as VLDPE are preferred.

The surface layers (layers A' and C') are made of a resin mainly comprising a polypropylene resin as stated. The surface layers may be the same or different in composition. The polypropylene resin to be used is not particularly limited, and any general-purpose polypropylene resins are usable. The resin compositions for making the surface layers should have a polypropylene resin content of at least 60% by weight, preferably 90% by weight or more. A polypropylene resin content of less than 60% by weight results in reduced heat resistance, and the resulting multilayer wrap film suffers fusion to itself or breakage due to melting when used in microwave cooking.

The polypropylene resin suitable as the layers A' and C' includes a polypropylene homopolymer, an ethylene-propylene random copolymer, and an ethylene-propylene-butene copolymer each of which contains no antiblocking agents nor lubricants. If desired, the resin composition making the layers A' and C' can contain additives such as contact improving agents, such as polybutene, polyisobutylene, terpene resins and petroleum resins; feed improving agents, such as glycerol fatty acid esters; antistatic agents, anti-fogging agents, and antioxidants.

It is desirable for contact that the multilayer film of the fourth aspect have a center-line surface roughness Ra of 0.08 $\mu$m or smaller and a 10 point height parameter Rz of 0.65 $\mu$m or smaller, both measured in accordance with JIS B0601. The multilayer film whose surface roughness exceeds the above level may result in reduction of contact or cling as a wrap film.

The polyolefin resin making the B' layer preferably includes an ethylene-propylene random copolymer, an ethylene-propylene-butene copolymer, olefin elastomers (TPOs) prepared by dispersing ethylene-butene rubber, ethylene-propylene rubber, etc. in a polypropylene resin or by multi-stage polymerization, very-low-density polyethylene (VLDPE), linear low-density polyethylene (LLDPE), which is an ethylene-$\alpha$-olefin copolymer, and an ethylene-butene copolymer. Particularly preferred are an ethylene-propylene random copolymer, an ethylene-butene copolymer, TPOs, VLDPE, and LLDPE.

Commercially available TPOs include Adflex resins available from Sun Allomer Co., Ltd. and CAP resins available from Ube Industries, Ltd. Commercially available VLDPE resins include Excellen VL from Sumitomo Chemical Co., Ltd., Nackflex from Union Carbide Corp., and Attane from The Dow Chemical Company. Commercially available LLDPE resins include Affinity from The Dow Chemical Company.

Softness of a polyolefin resin is generally specified in terms of flexural modulus measured according to JIS K7171 (ISO178:1993). In this connection, the polyolefin resin used in the fourth aspect is preferably one having a flexural modulus of 100 MPa or less, particularly 15 to 90 MPa, which is of what we call supersoft grade. Polyolefin resins having a flexural modulus of 100 MPa or less include the above-mentioned TPOs, VLDPE, LLDPE, and an ethylene-butene copolymer (e.g., Tafmer, available from Mitsui Chemicals, Inc.).

The polyolefin resin, especially the TPO is preferably used chiefly in the B' layer, specifically in a proportion of 30 up to 100% by weight, particularly 35 up to 100% by weight, in the layer B'. The polyolefin resin, e.g., the TPO, is also usable in the layers A' and C' in such proportions that do not reduce the performance as a wrap film, i.e., in such an amount that the propylene resin content in these layers is 60% by weight or more.

The total amount of the polyolefin resins in the multilayer film is preferably 25% by weight or more, still preferably 28 to 90% by weight. Where a total content of polyolefin resins such as TPOs, is less than 25% by weight, the biaxially stretched multilayer film having a polypropylene resin layer on each side thereof is apt to have a tensile modulus higher than 450 MPa and, which can result in insufficient contact. If the total content exceeds 90% by weight, the film tends to have a tensile modulus less than 150 MPa and poor handling properties. The polyolefin resins such as TPOs which are incorporated into the surface layers should be selected from those compatible to the polypropylene resin so as not to result in a rough surface. A large surface roughness causes reduction in contact.

The polyolefin resin is used to control the tensile modulus at or below 450 MPa, particularly between 150 and 450 MPa, in both the MD and the TD in order for the film to have satisfactory contact, which is an important property as wrap film. If the tensile modulus of a film exceeds 450 MPa, the film once brought into contact with a container as a wrap film for home use tends to get loose from the container with time due to its rigidity. If the tensile modulus is less than 150 MPa, the film is too soft for handling.

The film having a tensile modulus of 150 to 450 MPa in both the MD and the TD, being flexible, serves for wrapping containers or foods as done for merchandise typically in supermarkets. That is, it is capable of wrapping a container under tension so that a liquid in the container may not spill, enfolding a foamed polystyrene container, a paper-made container or a like object, which have a rough surface and are not easy to wrap in, while clinging to itself at the folds, and directly wrapping vegetables and the like. Further, having been simultaneously biaxially stretched to have an elongation at break of 120% or less in both the MD and the TD, the film exhibits satisfactory cutting properties not heretofore attained with wrap films for commercial use and is therefore useful as a wrap film for both domestic and commercial use. In sequential biaxial stretching, it is not easy to control both the tensile modulus and the elongation at break within the respective ranges. Where a film is simultaneously biaxially stretched to have a tensile modulus of 150 to 450 MPa in both the MD and TD, the stretched film shows satisfactory cutting properties even with a relatively high elongation at break in a range, e.g., of from 80 to 120%.

Unlike relevant conventional techniques in which a polyamide resin or a polyester resin is used as an intermediate layer, the multilayer film of the fourth aspect comprises polyolefin resins having good compatibility with each other to form the intermediate layer and the two surface layers. Therefore, the residuals of the multilayer film can be reclaimed to bring improved workability and economy in the manufacture.

For use as a home wrap film, it is important for the film to have a thickness of 8 to 15 $\mu$m. A film with a thickness smaller than 8 $\mu$m has weak strength and easily tears when unwound or used for wrapping. A film with a thickness exceeding 15 $\mu$m is so rigid that it loses cling with time due to repulsion after wrapping.

If desired, the resin composition making the intermediate layer B' can contain additives such as contact improving agents, such as polybutene, polyisobutylene, terpene resins and petroleum resins; feed improving agents, such as glycerol fatty acid esters; antistatic agents, anti-fogging agents, and antioxidants.

The thickness of the intermediate layer B' is preferably in a range of 40 to 90% of the total thickness. A thickness ratio smaller than 40% tends to result in poor contact as a wrap film because of the influences of the surface layers. A thickness ratio greater than 90% tends to result in poor heat resistance, For the same reasons, a preferred thickness ratio of the layer B' is 50 to 80%. It is preferred for the layers A' and C' to have about the same thickness. It is still preferred that the thickness of one of them should not be less than 80% of that of the other.

The present invention will now be illustrated in greater detail with reference to Examples. The following Examples are presented as being exemplary of the present invention and should be not construed as being limiting. Unless otherwise noted, all the parts and percents are by weight.

EXAMPLES 1 TO 6 AND COMPARATIVE EXAMPLES 1 TO 4

Examples and Comparative Examples of the First Aspect

Various wrap films were prepared from the formulations shown in Table 1 below as follows. The polypropylene resin for the surface layers and the resin(s) for the intermediate layer were each melt-kneaded together with the additives shown in Table 1 in a twin-screw extruder and pelletized. The resulting two kinds of resin compounds were co-extruded to form a three-layered film, which was stretched 5 fold in the longitudinal direction and 4.5 fold in the transverse direction to obtain a wrap film. The wrap film was evaluated for contact (with a glass bowl and a stainless steel bowl), cling, and cutting properties in accordance with the test methods described below. The elongation at break and the strength at 5% elongation of the wrap film were measured. The results of evaluation and measurements are shown in Table 1. The particulars of the materials used in the formulation and the abbreviations used in Table 1 are described in Table 2.

1) Contact

The opening of a glass bowl and a stainless steel bowl was covered with the wrap film, and the contact of the film to the container was observed with the naked eye and graded according to the following standards.

A . . . Complete contact
B . . . Insufficient contact
C . . . No contact

2) Cling

An onion was wrapped in the wrap film, and the cling of the film was observed with the naked eye and graded according to the following standards.

A . . . Good cling with no lifting
B . . . Insufficient cling
C . . . No cling

3) Cutting Properties

A roll of the wrap film around a paper core was put in a paper box shown in FIG. 1 which is the same as used in wrap films on the market (Saran Wrap, available from Asahi Chemical Industry Co., Ltd.), the length of the box being about the same as the length of the paper core. The box has a saw blade along the edge of the top cover. A panel of 5 members cut the unwound film with the saw blade and rated the ease of cutting as follows.

A . . . Three or more out of five panel members felt that the film was easy to cut.
B . . . Two or fewer out of five panel members felt that the film was easy to cut (i.e., three or more panel members felt difficulty in cutting the film).
C . . . All the five panel members felt that the film was difficult to cut.

The force required to cut the film was measured as follows. A roll of the wrap film was put in a paper box provided with a saw blade made of a tinplate (see FIG. 1). The saw teeth had a tip angle of 50°, a pitch of 1.25 mm and a height of 1.3 mm. A push-pull gauge (AIKOH 9500, supplied by Engineering Corp.) was set to hold the free end of the film and moved in a direction making a horizontal angle $\theta_H$ of 45° and a vertical angle (elevation) $\theta_v$ of 45° as depicted in FIG. 1 to cut the film. The initial reading at the start of cutting was taken as a force required to cut the film.

TABLE 2

| | Example 1 | Example 2 | Example 3 | Example 4 | Example 5 | Example 6 | Compara. Example 1 | Compara. Example 2 | Compara. Example 3 | Compara. Example 4 |
|---|---|---|---|---|---|---|---|---|---|---|
| Formulation (wt %) | | | | | | | | | | |
| 1st & 2nd Surface Layer | PP1 | PP1 | PP1 | PP2 | PP2 | PP2 | Saran Wrap | Riken Wrap | PP1 | PP2 |
| Intermediate Layer | PP1/E-P rubber (35/65) | PP1/E-P rubber (35/65) | PP1/E-P rubber (35/65) | PP1/E-P rubber/ E-αO3 (32/48/20) | E-αO1 | E-αO2 | | | PP1 | PP1/E-P rubber (80/20) |
| Additive 1 | 3.0 | — | — | 3.0 | 3.0 | 3.0 | | | 3.0 | 3.0 |
| Additive 2 | — | — | 2.0 | — | — | — | | | — | — |
| Additive 3 | 1.0 | — | — | 1.0 | 1.0 | 1.0 | | | 1.0 | 1.0 |
| Additive 4 | 1.8 | — | 1.8 | 1.8 | 1.8 | 1.8 | | | 1.8 | 1.8 |
| Additive 5 | MGMO 0.5 | MGMO 0.5 | DGMO 0.5 | MGMO 0.75 | MGMO 0.5 | MGMO 0.5 | | | MGMO 0.5 | MGMO 0.5 |
| Wrap Film | | | | | | | | | | |
| Thickness Ratio* | 1:8:1 | 1:8:1 | 1:8:1 | 1:8:1 | 1:2:1 | 1:2:1 | | | 1:8:1 | 1:8:1 |
| PP Content (%) | 45.0 | 47.8 | 45.9 | 42.6 | 46.9 | 46.9 | | | 93.7% | 78.7% |
| E-P Rubber Content (%) | 48.7 | 51.7 | 49.8 | 35.9 | — | — | | | — | 15.0% |
| E-αO Content (%) | — | — | — | 15.0 | 46.9 | 46.9 | — | — | — | — |
| Stretch Ratio (MD/TD) | 5.0/4.5 | 5.0/4.5 | 5.0/4.5 | 5.0/4.5 | 5/0/4.5 | 5.0/4.5 | — | — | 5.0/4.5 | 5.0/4.5 |
| Flexural Modulus (MPa) | | | | | | | | | | |
| Surface Layers | 900 | 900 | 900 | 600 | 600 | 600 | — | — | 900 | 900 |
| Intermdt. Layer | 85 | 85 | 85 | 60 | 24 | 24 | — | — | 900 | 300 |
| Thickness (μm) | 10 | 10 | 10 | 10 | 10 | 10 | 10 | 10 | 10 | 10 |

TABLE 2-continued

| | Example 1 | Example 2 | Example 3 | Example 4 | Example 5 | Example 6 | Compara. Example 1 | Compara. Example 2 | Compara. Example 3 | Compara. Example 4 |
|---|---|---|---|---|---|---|---|---|---|---|
| Contact | | | | | | | | | | |
| Glass Bowl | A | A | A | A | A | A | A | A | A | A |
| Stainless Steel Bowl | A | A | A | A | A | A | C | A | A | A |
| Cling | A | A | A | A | A | A | C | A | C | B |
| Cutting Properties (cN) | A (76) | A (68) | A (63) | A (60) | A (81) | A (66) | C** | A (65) | A (75) | |
| Strength at 5% Elongation (cN/10 mm); MD/CD | 99/98 | 116/81 | 130/98 | 89/82 | 138/121 | 130/112 | 311/264 | 53/41 | 272/307 | 173/159 |
| Elongation at Break (%); MD/CD | 60/72 | 65/86 | 60/72 | 54/45 | 61/64 | 61/64 | 24/31 | 115/315 | 63/74 | 61/64 |

Note:
*Thickness ratio of 1st surface layer:intermediate layer:2nd surface layer
**Incapable of being cut.

TABLE 2

| | |
|---|---|
| PP | polypropylene resin |
| PP1 | MI: 1.7 g/10 min; ethylene content: 4%; available from Sun Allomer |
| PP2 | MI: 5.5 g/10 min; ethylene content: 6%; butene content: 6%; available from Sun Allomer |
| E-P rubber | ethylene-propylene rubber; flexural modulus: 10 MPa; available from Sun Allomer |
| E-αO | ethylene-α-olefin copolymer |
| E-αO1 | MI: 0.8 g/10 min; α-olefin = octene (10%); flexural modulus: 85 MPa; density: 0.905 g/cm$^3$; available from The Dow Chemical Co. |
| E-αO2 | MI: 0.8 g/10 min; α-olefin = butene (15%); flexural modulus: 24 MPa; density: 0.884 g/cm$^3$; available from Union Carbide Corp. |
| E-αO3 | MI: 0.5 g/10 min; α-olefin = octene (25%); flexural modulus: 16 MPa; density: 0.868 g/cm$^3$; available from The Dow Chemical Co. |
| Additive 1 | polybutene; number average molecular weight: 960 |
| Additive 2 | terpene resin; softening point: 115° C. |
| Additive 3 | diglycerol tetraoleate; available from Sakamoto Yakuhin Kogyo Co., Ltd. |
| Additive 4 | glycerol diacetylmono-oleate; available from Taiyo Kagaku Co., Ltd. |
| MGMO | glycerol mono-oleate; available from Kao Corp. |
| DGMO | diglycerol mono-oleate; available from Sakamoto Yakuhin Kogyo Co., Ltd. |

As is apparent from the results in Table 1, the films according to the first aspect of the present invention satisfy various performance requirements as wrap film.

EXAMPLES 7 TO 12 AND COMPARATIVE EXAMPLES 5 TO 7

Examples and Comparative Examples of Second Aspect

A polypropylene resin (weight average molecular weight: 700,000; density: 0.90 g/cm$^3$; propylene content: 96.9%; ethylene content: 3.1%; MI: 1.8 g/10 min) as component A was mixed with components B to E shown in Table 3 below by batch compounding to prepare a polypropylene resin compound. The particulars of the components are described in Table 4. The resulting compound was extruded by use of a blown-film extruder at an extrusion temperature of 220° C. in a downward water cooling system to obtain a tubular sheet having a thickness of 200 μm. The resulting tubular sheet was introduced into a tubular method biaxial stretching machine and simultaneously stretched biaxially at a stretch ratio of 4.5 each in the MD and the TD at 120° C. in a conventional manner to obtain a stretched film having the thickness shown in Table 3. The film thickness was measured with a thickness meter ID-C112C supplied by Mitutoyo Corp. The stretched film was aged at 40° C. for 1 day to accelerate uniform bleeding of the additives to the film surface and then slit to a width of 300 mm. A 20 m length of the film was wound around a paper core having a diameter of 1.5 in.

The resulting stretched film in roll form was evaluated for contact (with a glass bowl and a stainless steel bowl) and cutting properties in the same manner as in Example 1 and additionally for unwinding properties and tear resistance in accordance with the methods described below. Further, the haze of the stretched film was measured. The results obtained are shown in Table 3.

1) Unwinding Properties

The wrap film roll was put in a paper box shown in FIG. 1 which is the same as used in wrap films on the market (Saran Wrap, available from Asahi Chemical Industry Co., Ltd.), the length of the box being about the same as the length of the paper core. The film roll in the box was stored at 40° C. for 2 days and then returned to room temperature. The leading end of the roll was held between the chucks of a push-pull gauge and unwound at a speed of 30 m/min. The maximum force required to unwinding (cN/300 mm-width) was taken as a measure of the unwinding properties. The smaller the force, the better the unwinding properties.

2) Tear Resistance

A tearing force was measured with an Elmendorf tester manufactured by Toyo Seiki K. K. according to JIS P8116, which was taken as a measure for tearing resistance.

3) Haze

The haze was measured with HR-100 supplied by Murakami Color Research Laboratory according to JIS K7105 Method A. A haze value is a measure of film transparency. A smaller value indicates a higher transparency.

TABLE 3

| | Components (wt %) | | | | Thickness | Contact with Container | | Unwinding Properties | Tear Resistance | Cutting Properties | Haze |
|---|---|---|---|---|---|---|---|---|---|---|---|
| | B | C* | D* | E | (μm) | Glass | Stainless Steel | (cN/300 mm) | (cN) | | |
| Example | | | | | | | | | | | |
| 7 | polybutene A: 5.0 | glycerol mono-oleate (4.2): 0.5 | Diglycerol tetraoleate (1.6): 1.0 | glycerol diacetyl-monolaurate: 2.0 | 9.5 | A | A | 318 | 4 | good | 0.8 |
| 8 | polybutene A: 3.0 | glycerol mono-oleate (4.2): 0.5 | diglycerol tetraoleate (1.6): 1.0 | glycerol diacetyl-monolaurate: 1.8 | 9.8 | A | A | 179 | 3 | good | 0.4 |
| 9 | polybutene A/ alicyclic satd. hydro-carbon resin: 2.0/5.0 | glycerol mono-oleate (4.2): 0.5 | diglycerol tetraoleate (1.6): 1.0 | glycerol diacetyl-monolaurate: 2.0 | 10.4 | A | A | 204 | 7 | good | 0.5 |
| 10 | polybutene A: 4.0 | glycerol monolaurate (5.4): 0.2 | diglycerol tetraoleate (1.6): 1.3 | glycerol diacetyl-monolaurate: 1.3 | 10.0 | A | A | 331 | 6 | good | 0.5 |
| 11 | polybutene A: 4.0 | diglycerol monomyristate (7.9): 0.2 | diglycerol tetraoleate (1.6): 1.3 | glycerol diacetyl-monolaurate: 1.3 | 10.2 | A | A | 367 | 5 | good | 0.5 |
| 12 | polybutene A: 7.0 | diglycerol monostearate (6.9): 1.0 | diglycerol tetraoleate (1.6): 2.0 | — | 8.7 | A | A | 238 | 5 | good | 2.0 |
| Comp. Example | | | | | | | | | | | |
| 5 | polybutene A: 7.0 | — | diglycerol tetraoleate (1.6): 1.5 | — | 7.0 | A | C | 642 | 5 | good | 0.5 |
| 6 | polybutene B: 2.0 | diglycerol monostearate (6.9): 0.4 | — | glycerol diacetyl-monolaurate: 0.4 | 9.0 | C | C | 15 | 3 | good | 1.1 |
| 7 | polybutene A: 5.0 | — | diglycerol tetraoleate (1.6): 1.3 | glycerol diacetyl-monolaurate: 1.3 | 11.3 | A | A | 702 | 5 | good | 0.3 |

Note:
*Values in the parentheses are HLB values.

TABLE 4

| | |
|---|---|
| Polybutene A | PB100R, available from Idemitsu Petrochemical Co., Ltd.; number average molecular weight: 960 |
| Polybutene B | HV35, available from Nippon Petrochemical Co., Ltd. ; number average molecular weight: 750 |
| Alicydic saturated hydrocarbon resin | Arkon P-125, available from Arakawa Chemical Industries, Ltd. |
| Glycerol mono-oleate | Excel O-95R, available from Kao Corp. |
| Glycerol monolaurate | Sunsoft 750, available from Taiyo Kagaku Co., Ltd. |
| Diglycerol monomyristate | DGMM, available from Sakamoto Yakuhin Kogyo Co., Ltd. |
| Diglycerol monostearate | DGMS, available from Sakamoto Yakuhin Kogyo Co., Ltd. |
| Diglycerol tetra-oleate | DG4, available from Sakamoto Yakuhin Kogyo Co., Ltd. |
| Diglycerol mono-oleate | DGMO, available from Sakamoto Yakuhin Kogyo Co., Ltd. |
| Glycerol diacetylmonolaurate | Sun Fat U-12, available from Taiyo Kagaku Co., Ltd. |

As can be seen from the results in Table 3, the films according to the second aspect of the present invention provide good contact to both the glass bowl and the stainless steel bowl and exhibit excellent unwinding properties, tear resistance, and cutting properties. The results of Examples 7 to 11 in comparison with Comparative Example 12 prove that incorporation of component (E) brings about further reduction of haze and further improvement in transparency.

EXAMPLE 13

Example of Third Aspect

Resin composition A-1 for layer A (see Table 5) consisting of 100 parts of an ethylene-propylene-butene copolymer having an MFR of 5.5 g/10 min (230° C.) and a DSC peak melting temperature of 133° C. and 5.0 parts of polyisobutylene (Himol, available from Nippon Oil Co., Ltd.), resin composition B-1 for layer B (see Table 5) consisting of 100 parts of an ethylene-propylene random copolymer having an MFR of 2.5 g/10 min (230° C.) and a DSC peak melting temperature of 136° C., 3.3 parts of polybutene (PB100R, available from Idemitsu Petrochemical Co., Ltd.) and 1.7 parts of glycerol diacetylmonolaurate (PL014, available from Riken Vitamin Co., Ltd.), and resin composition C-1 for layer C (see Table 5) consisting of 100 parts of an ethylene-propylene random copolymer having an MFR of 2.5 g/10 min (230° C.) and a DSC peak melting temperature of 135° C. and 5.0 parts of polybutene (PB100R) were co-extruded through a circular die having a diameter of 200 mm to form a tubular sheet having an A:B:C layer thickness ratio of 3/6/1, which was quenched with water at 12° C. to obtain a tubular sheet having a thickness of 200 µm. The tubular sheet was led to an inflation biaxial stretching machine and simultaneously biaxially stretched at 120° C. at a stretch ratio of 4.5 both in the MD and in the TD in a usual manner to obtain a stretched film having a thickness of about 10 µm. The extrudability of the resin compositions into sheeting, stretchability of the extruded sheet, and the wrap film performance of the resulting film in terms of unwinding properties, cutting properties, contact, and heat resistance were evaluated as follows. As a result, the resin compositions had satisfactory extrudability, and the extruded tubular sheet had a satisfactory open character at the start of stretching and satisfactory stretch stability. The resulting film was almost equal in performance as a wrap film to a commercially available wrap film.

1) Extrudability

The resin compositions were co-extruded by use of a general extruder. Extrudability was graded A or B based on the load on the extruder, the appearance of extruded sheeting, and thickness unevenness of the extruded sheet as observed or measured.

A . . . As satisfactory as polypropylene.

B . . . The load varies greatly, or the sheet has a poor appearance, or the thickness varies unadjustably.

2) Stretchability

The extruded tubular sheet was subjected to simultaneous biaxial stretching by use of a usual double bubble system biaxial stretching machine or, for comparison, sequential biaxial stretching by use of a general tenter type biaxial stretching machine. The stretchability of the sheet was evaluated in terms of workability at the start of stretching, stretch stability, and thickness unevenness of the stretched film.

A . . . The workability is equal to that of polypropylene. The stretching is stably carried out, and no thickness unevenness occurs.

B . . . The workability is slightly inferior to that of polypropylene, but the stretching is stable. Not problematical in practice.

C . . . The workability at the start of stretching is poor, or the film is apt to break while being stretched.

3) Unwinding Properties

The stretched film 30 cm wide and 20 m long was wound around a paper core and put in a paper box having a saw blade. The paper core and the paper box were the same as those used in a commercially available wrap film for domestic use (Saran Wrap from Asahi Chemical Industry Co., Ltd.). When the box was held in one hand, and the film was unwound by the other hand, the ease of unwinding was graded as follows.

A . . . Equal to the commercially available wrap film (Saran Wrap).

B . . . Resistant as compared with Saran Wrap, but usable.

C . . . The roll is so resistant to unwinding that the film tears or the roll comes out of the box.

4) Cutting Properties

The same paper box containing the same film roll as prepared in (3) above was tilted at 45°, and the film was unrolled and cut with the saw blade at an angle of 45°. The stress at the start of cutting (cutting resistance) was measured with a hand gauge. The stress of 100 cN or smaller means satisfactory cutting properties. Where the stress exceeds 130 cN, the saw blade will have undergone damage by the time the cutting operation is repeated several times (poor cutting properties).

5) Contact

A commercially available ceramic container was overwrapped in the film. The contact of the film to the container and to itself was graded.

A . . . Equal to the commercially available wrap film (Saran Wrap).

B . . . Slightly looser than Saran Wrap but maintaining the shape of the container.

C . . . Loose around the container, partly losing the contact.

6) Heat Resistance

The heat resistance of the film was measured in accordance with the implementing outline for wrap quality labeling based on The Metropolitan Tokyo Consumer Life Ordinance §11. The wrap film was cut in a size of 14 cm×3 cm.

The cut film was overlaid on a paper board having the same size. The upper area (2.5 cm×3 cm) and the bottom area (2.5 cm×3 cm) of the cut film was adhered to the paper board by an adhesive tape to prepare a specimen. The upper area (2.5 cm×3 cm) of the specimen was clamped. A weight weighing 10 g was attached to the bottom area (2.5 cm×3 cm) of the specimen. Then, the specimen was quickly put in an air-oven which temperature was kept constant. The specimen was heated in the oven for 1 hour. 1 hour later, the specimen was taken out of the oven to see whether the film was broken. If the film was not broken, the temperature of the oven was raised by 5° C., and the same procedure was repeated. The maximum temperature at which the film was not broken was referred to as "heat resistance temperature".

EXAMPLE 14

Example of Third Aspect

A multilayer film having a thickness of about 10 µm was obtained in the same manner as in Example 13, except for replacing the resin composition A-1 for layer A with resin composition A-2 (see Table 5) consisting of 100parts of an ethylene-propylene-butene copolymer having an MFR of 5.5 g/10 min (230° C.) and a DSC peak melting temperature of 133° C., 4.0 parts of polybutene (PB100R, available from Idemitsu Petrochemical Co., Ltd.), and 5.0 parts of polyisobutylene (Himol, available from Nippon Oil Co., Ltd.). The extrudability and stretch stability in the film production were satisfactory. The resulting film had improved contact as shown in Table 6 and was close to Saran Wrap in performance as a wrap film.

EXAMPLE 15

Example of Third Aspect

A multilayer film having a thickness of about 10 µm was obtained in the same manner as in Example 13, except for replacing the resin composition A-1 for layer A with resin composition A-3 (see Table 5) consisting of 100 parts of an ethylene-propylene random copolymer having an MFR of 2.5 g/10 min (230° C.) and a DSC peak melting temperature of 135° C., 4.0 parts of polybutene (PB100R from Idemitsu Petrochemical Co., Ltd.), 5.0 parts of polyisobutylene (Himol from Nippon Oil Co., Ltd.), and 1.7 parts of glycerol diacetylmonolaurate (PL014 from Riken Vitamin Co., Ltd.). The extrudability and stretch stability in the film production were satisfactory. The resulting film had improved contact as shown in Table 6 and was close to Saran Wrap in performance as a wrap film.

EXAMPLE 16

Example of Third Aspect

A multilayer film having a thickness of about 10 µm was obtained in the same manner as in Example 13, except for replacing the resin composition A-1 for layer A with resin composition A-3 as used in Example 15 and replacing the resin composition B-1 for layer B with resin composition B-2 (see Table 5) which had twice as high polybutene content as the resin composition B-1. The extrudability and stretch stability in the film production were satisfactory. The quality of the resulting film as a wrap film was close to that of Saran Wrap as shown in Table 6.

EXAMPLE 17

Example of Third Aspect

A multilayer film having a thickness of about 10 µm was obtained in the same manner as in Example 13, except for replacing the resin composition A-1 for layer A with resin composition A-2 used in Example 14 and replacing the resin composition B-1 for layer B with resin composition B-3 (see Table 5) consisting of 100 parts of an ethylene-propylene-butene copolymer having an MFR of 7.0 g/10 min (230° C.) and a DSC peak melting temperature of 140° C., 10 parts of polybutene (PB100R from Idemitsu Petrochemical Co., Ltd.), and 5.0 parts of glycerol diacetylmonolaurate (PL014 from Riken Vitamin Co., Ltd.). The extrudability and stretch stability in the film production were satisfactory. The quality of the resulting film as a wrap film was close to that of Saran Wrap as shown in Table 6.

EXAMPLE 18

Example of Third Aspect

A multilayer film having a thickness of about 10 µm was obtained in the same manner as in Example 13, except for replacing the resin composition A-1 for layer A with resin composition A-3 used in Example 15, replacing the resin composition B-1 for layer B with resin composition B-4 (see Table 5) consisting of 70 parts of an ethylene-propylene-butene copolymer having an MFR of 7.0 g/10 min (230° C.) and a DSC peak melting temperature of 140° C., 30 parts of an amorphous polyolefin resin having an MFR of 7.0 g/10 min (230° C.) and a Shore D hardness of 41 (CAP 340, available from Ube Industries, Ltd.), 6.6 parts of polybutene (PB100R from Idemitsu Petrochemical Co., Ltd.), and 1.7 parts of glycerol diacetylmonolaurate (PL014 from Riken Vitamin Co., Ltd.), and replacing the resin composition C-1 for layer C with a resin composition C-2 (see Table 5) consisting of 100 parts of an ethylene-propylene-butene copolymer having an MFR of 5.5 g/10 min (230° C.) and a DSC peak melting temperature of 133° C. and 5.0 parts of polybutene (PB100 from Idemitsu Petrochemical Co., Ltd.). The extrudability and stretch stability in the film production were satisfactory. The resulting film had improved cutting properties as shown in Table 6 and was close to Saran Wrap in performance as a wrap film.

EXAMPLE 19

Example of Third Aspect

A multilayer film having a thickness of about 10 µm was obtained in the same manner as in Example 13, except for replacing the resin composition A-1 for layer A with resin composition A-3 used in Example 15 and replacing the resin composition B-1 for layer B with resin composition B-5 (see Table 5) consisting of 50 parts of an ethylene-propylene-butene copolymer having an MFR of 7.0 g/10 min (230° C.) and a DSC peak melting temperature of 140° C., 30 parts of an amorphous polyolefin resin having an MFR of 7.0 g/10 min (230° C.) and a Shore D hardness of 41 (UB-CAP 340 from Ube Industries, Ltd.), 20 parts of a reclaimed material generated from the residuals of Example 18, 6.6 parts of polybutene (PB100R from Idemitsu Petrochemical Co., Ltd.), and 1.7 parts of glycerol diacetylmonolaurate (PL014 from Riken Vitamin Co., Ltd.). The extrudability and stretch stability in the film production were satisfactory. As shown in Table 6, no adverse influences of the reclaimed material on quality as a wrap film was observed.

EXAMPLE 20

Example of Third Aspect

The same resin compositions as used in Example 19 were co-extruded through a circular die having a diameter of 200 mm to form a tubular sheet having a thickness of 200 μm, which was quenched with water at 12° C. to obtain a tubular sheet having a thickness of 200 μm. The tubular sheet was irradiated with 10 Mrad of electron radiation and led to an inflation biaxial stretching machine where it was simultaneously biaxially stretched at 120° C. at a stretch ratio of 4.5 both in the MD and the TD in a usual manner to obtain a stretched film having a thickness of about 10 μm. The extrudability of the resin compositions and the stretchability of the extruded sheet were satisfactory. The resulting film exhibited greatly improved cutting properties as shown in Table 6 and was equal or superior to Saran Wrap.

COMPARATIVE EXAMPLE 8

Comparative Example of Third Aspect

The same resin compositions as used in Example 16 were co-extruded at the same thickness ratio as in Example 16 through a T-die having a slit width of 200 mm. The extruded sheet was brought into contact with a chill roll at 30° C. by an air knife to obtain a multilayer sheet having a thickness of 400 μm. The extruded sheet was sequentially stretched by a tenter method at a stretch ratio of 5.0 in the MD and 8.0 in the TD to obtain a stretched film having a thickness of about 10 μm. The wrap film performance of the resulting

TABLE 5

|  | A-1 | A-2 | A-3 | B-1 | B-2 | B-3 | B-4 | B-5 | C-1 | C-2 | C-3 |
| --- | --- | --- | --- | --- | --- | --- | --- | --- | --- | --- | --- |
| Polypropylene Resin | E-P-B* | E-P-B | E-P** | E-P | E-P | E-P-B | E-P-B | E-P-B | E-P | E-P-B | E-P-B |
|  | 100 | 100 | 100 | 100 | 100 | 100 | 70 | 50 | 100 | 100 | 100 |
| MFR/DSC Peak Temp. | 5.5/133 | 5.5/133 | 2.5/135 | 2.5/136 | 2.5/136 | 7.0/140 | 7.0/140 | 7.0/140 | 2.5/135 | 5.5/133 | 5.5/133 |
| Amorphous Polyolefin (Shore D Hardness) | — | — | — | — | — | — | 30 (41) | 30(41) | — | — | — |
| Reclaim | — | — | — | — | — | — | — | 20 | — | — | — |
| Polybutene | — | 4.0 | 4.0 | 3.3 | 6.6 | 10.0 | 6.6 | 6.6 | 5.0 | 5.0 | — |
| Polyisobutylene | 5.0 | 5.0 | 5.0 | — | — | — | — | — | — | — | — |
| Glycerol Fatty Acid Ester | — | — | 1.7 | 1.7 | 1.7 | 5.0 | 1.7 | 1.7 | — | — | — |

Units of composition: part by weight
Note:
*E-P-B: Ethylene-propylene-butene copolymer
**E-P: Ethylene-propylene copolymer

TABLE 6

|  | Example 13 | Example 14 | Example 15 | Example 16 | Example 17 |
| --- | --- | --- | --- | --- | --- |
| Layer A (outer) | A-1 | A-2 | A-3 | A-3 | A-2 |
| Layer B (intermediate) | B-1 | B-1 | B-1 | B-2 | B-3 |
| Layer C (inner) | C-1 | C-1 | C-1 | C-1 | C-1 |
| A/B/C Thickness Ratio | 3/6/1 | 3/6/1 | 3/6/1 | 3/6/1 | 3/6/1 |
| Stretch Method | simultaneous biaxial | simultaneous biaxial | simultaneous biaxial | simultaneous biaxial | simultaneous biaxial |
| Stretch Ratio (MD/TD) | 4.5/4.5 | 4.5/4.5 | 4.5/4.5 | 4.5/4.5 | 4.5/4.5 |
| Electron Irradiation | undone | undone | undone | undone | undone |
| Extrudability | A | A | A | A | A |
| Stretch Stability | A | A | A | A | A |
| Unwinding Properties | B | B | A | A | B |
| Cutting Properties (cN) | 80 | 80 | 90 | 90 | 80 |
| Contact | B | A | A | A | A |
| Heat Resistance (° C.) | 140 | 140 | 140 | 140 | 140 |

|  | Example 18 | Example 19 | Example 20 | Saran Wrap |
| --- | --- | --- | --- | --- |
| Layer A (outer) | A-3 | A-3 | A-3 | — |
| Layer B (intermediate) | B-4 | B-5 | B-5 | — |
| Layer C (inner) | C-2 | C-2 | C-2 | — |
| A/B/C Thickness Ratio | 3/6/1 | 3/6/1 | 3/6/1 | — |
| Stretch Method | simultaneous biaxial | simultaneous biaxial | simultaneous biaxial | — |
| Stretch Ratio (MD/TD) | 4.5/4.5 | 4.5/4.5 | 4.5/4.5 | — |
| Electron Irradiation | undone | undone | 10 Mrad | — |
| Extrudability | A | A | A | — |
| Stretch Stability | A | A | A | — |
| Unwinding Properties | A | A | A | A |
| Cutting Properties (cN) | 70 | 70 | 45 | 50 |
| Contact | A | A | A | A |
| Heat Resistance (° C.) | 140 | 140 | 140 | 140 | film is shown in Table 7 below. As can be seen from Table 7, the film had poor cutting properties with a cutting resistance as high as 135 cN.

COMPARATIVE EXAMPLE 9

Comparative Example of Third Aspect

A multilayer film having a thickness of about 10 μm was obtained in the same manner as in Example 17, except for using an ethylene-propylene-butene copolymer (C-3; see Table 5) as a resin for making layers A and C. As shown in Table 7, the resulting film had insufficient contact.

COMPARATIVE EXAMPLE 10

Comparative Example of Third Aspect

A multilayer film having a thickness of about 10 μm was obtained in the same manner as in Comparative Example 9, except for changing the A/B/C thickness ratio to 1/8/1. As shown in Table 7, the resulting film also had insufficient contact.

TABLE 7

|  | Compara. Example 8 | Compara. Example 9 | Compara. Example 10 | Saran Wrap |
|---|---|---|---|---|
| Layer A (outer) | A-3 | C-3 | C-3 | — |
| Layer B (intermediate) | B-2 | B-3 | B-3 | — |
| Layer C (inner) | C-1 | C-3 | C-3 | — |
| A/B/C Thickness Ratio | 3/6/1 | 3/6/1 | 1/8/1 | — |
| Stretch Method | sequential biaxial | simultaneous biaxial | simultaneous biaxial | — |
| Stretch Ratio (MD/TD) | 5.0/8.0 | 4.5/4.5 | 4.5/4.5 | — |
| Electron Irradiation | undone | undone | undone | — |
| Extrudability | A | A | A | — |
| Stretch Stability | A | A | A | — |
| Unwinding Properties | A | A | A | A |
| Cutting Properties (cN) | 135 | 80 | 80 | 50 |
| Contact | A | C | C | A |
| Heat Resistance (° C.) | 140 | 140 | 140 | 140 |

EXAMPLE 21

Example of Fourth Aspect

An ethylene-propylene random copolymer having an ethylene content of 4.0% and an MFR of 2.0 g/10 min (230° C.) was used to make surface layers (layers A' and C'). A resin composition consisting of 62.5 parts of the same ethylene-propylene random copolymer as used for the surface layers and 37.5 parts of a polypropylene elastomer having a flexural modulus of 84 MPa measured according to JIS K7171 (1994) (ISO178:1993) (Adflex KS-353P, available from Sun Allomer Co., Ltd.) was used to make an intermediate layer (layer B'). The two resin materials were co-extruded through a circular die having a diameter of 200 mm to form an A'/B'/C' layer structure at an A'/B'/C' weight ratio of 1/8/1, which was quenched with water at 12° C. to obtain a tubular sheet having a thickness of 200 μm. The tubular sheet was led to an inflation biaxial stretching machine and simultaneously biaxially stretched at 120° C. at a stretch ratio of 4.5 in both the MD and the TD by a double bubble method to obtain a stretched film having a thickness of about 10 μm. The surface roughness (center-line mean surface roughness Ra and 10 point height parameter Rz), tensile modulus, elongation at break, and wrap film performance of the resulting film are shown in Table 8 below, which prove the film no inferior to a commercially available PVDC wrap film.

EXAMPLE 22

Example of Fourth Aspect

A multilayer film having a thickness of about 10 μm was obtained in the same manner as in Example 21, except that each layer further contained 5.0 parts of polybutene and 2.0 parts of a glycerol ester per 100 parts of the respective resin material. The resulting film was very easy to use as a wrap film with better contact and more ease in unwinding.

EXAMPLE 23

Example of Fourth Aspect

The same resin compositions used in Example 22 were co-extruded through a T-die to prepare a multilayer film sheet having a thickness of 200 μm and an A'/B'/C' layer weight ratio of 1/8/1, which was simultaneously biaxially stretched with a table type biaxial stretching machine manufactured by Iwamoto Seisakusho at an MD stretch ratio of 4.5 and a TD stretch ratio of 4.5 to obtain a biaxially stretched film having a thickness of about 10 μm. The resulting film was, being equal to that of Example 22 in performance, very easy to use as a wrap film.

EXAMPLE 24

Example of Fourth Aspect

An ethylene-propylene random copolymer having an ethylene content of 4.0% and an MFR of 2.0 g/10 min (230° C.) was used to make surface layers (layers A' and C'). A resin composition consisting of 37.5 parts of the same ethylene-propylene random copolymer as used for the surface layers and 62.5 parts of a polypropylene elastomer having a flexural modulus of 84 MPa (Adflex KS-353P, available from Sun Allomer Co., Ltd.) was used to make the intermediate layer (layer B'). The two resin materials were laminated and co-extruded through a circular die having a diameter of 200 mm to form an A'/B'/C' layer structure at an A'/B'/C' weight ratio of 1/8/1, which was quenched with water at 12° C. to obtain a tubular sheet having a thickness of 240 μm. The tubular sheet was led to an inflation biaxial stretching machine and simultaneously biaxially stretched at 120° C. at an MD stretch ratio of 4.5 and a TD stretch ratio of 4.5 by a double bubble method to obtain a stretched film having a thickness of about 12 μm. The resulting film, while thicker than those of Examples 21 to 23, exhibits satisfactory performance as a wrap film because the increased amount of the elastomer incorporated into the B' layer suppresses repulsion as a whole.

EXAMPLE 25

Example of Fourth Aspect

A biaxially stretched multilayer film having a thickness of about 15 μm was obtained from a tubular sheet having a thickness of 300 μm in the same manner as in Example 24, except for using a polypropylene elastomer (Adflex KS-353P from Sun Allomer Co., Ltd.) as the B' layer and adding 5.0 parts of polybutene and 2.0 parts of a glycerol ester to each of the A', B' and C' layers per 100 parts of the respective resins. The resulting film was as satisfactory as those obtained in Examples 22 to 24.

EXAMPLE 26

Example of Fourth Aspect

A biaxially stretched multilayer film having a thickness of about 10 μm was obtained in the same manner as in Example 21, except that a resin composition consisting of 80 parts of a polypropylene elastomer (Adflex KS-353P from Sun Allomer Co., Ltd.) and 20 parts of reclaimed pellets prepared from the residuals (a mixture of the layers A', B' and C') generated in Example 21 was used to make the B' layer and that 5.0 parts of polybutene and 2.0 parts of a glycerol ester were added to each of the A', B' and C' layers per 100 parts of the respective resin materials. The resulting film was as satisfactory as those obtained in Examples 22 and 23.

EXAMPLE 27

Example of Fourth Aspect

A biaxially stretched multilayer film having a thickness of about 10 μm was obtained in the same manner as in Example 21, except for using a resin composition consisting of 65 parts of the same ethylene-propylene random copolymer as used in Example 21, 35 parts of an ethylene-octene elastomer (Affinity EG8150 available from The Dow Chemical Co.; flexural modulus: 22 MPa), 5.0 parts of polybutene, and 2.0 parts of a glycerol ester to make the layers A', B' and C'. Although the resulting film showed slightly reduced heat resistance, it was equal in quality to a commercially available PVDC wrap film.

EXAMPLE 28

Example of Fourth Aspect

A biaxially stretched multilayer film having a thickness of about 10 μm was obtained in the same manner as in Example 22, except for using the same resin composition for the B' layer as used in Example 27 to form the B' layer.

COMPARATIVE EXAMPLE 11

Comparative Example of Fourth Aspect

A biaxially stretched multilayer film having a thickness of about 10 μm was obtained in the same manner as in Example 22, except for changing the mixing ratio of the ethylene-propylene random copolymer and the elastomer to 30:70. The resulting film had an increased tensile modulus and therefore showed poor contact as a wrap film.

COMPARATIVE EXAMPLE 12

Comparative Example of Fourth Aspect

The same resin compositions as used in Example 25 were co-extruded through a T-die to obtain a A'/B'/C' laminate sheet having a A'/B'/C' weight ratio of 1/8/1 and a thickness of 400 μm. The extruded sheet was subjected to sequential biaxial stretching by a tenter method at an MD stretch ratio of 5.0 and a TD stretch ratio of 8.0 to obtain a stretched film having a thickness of about 10 μm. The resulting film had a higher tensile modulus and a higher elongation at break than those obtained by simultaneous biaxial stretching and, as a result, exhibited greatly reduced cutting properties and contact.

COMPARATIVE EXAMPLE 13

Comparative Example of Fourth Aspect

A linear low-density polyethylene (LLDPE) having an MI of 1.4 (190° C.) and a density of 0.915 g/cm$^3$ (Moatec 0128N, available from Idemitsu Petrochemical Co., Ltd.) was used to make surface layers (layers A' and C'). A resin mixture consisting of 70 parts of an ethylene-propylene random copolymer having an ethylene content of 4.0% and an MFR of 2.0 g/10 min (230° C.) and 30 parts of a polypropylene elastomer having a flexural modulus of 84 MPa (Adflex KS-353P from Sun Allomer Co., Ltd.) was used to make an intermediate layer (layer B'). To each of the surface layer resin (100 parts) and the intermediate layer resin mixture (100 parts) were added 5.0 parts of polybutene and 2.0 parts of a glycerol ester. The two resin compounds were laminated and co-extruded through a circular die to form an A'/B'/C' layer structure at an A'/B'/C' weight ratio of 1/8/1, and the extruded tubular sheet was simultaneously biaxially stretched by a double bubble method to obtain a stretched film having a thickness of about 10 μm. The resulting film was very satisfactory in cutting properties, contact, and unwinding properties and had a heat resistance of 140° C. or higher. However, when rice in a container covered with the film was re-heated in a microwave oven, the film folding up over onto itself fused to itself.

COMPARATIVE EXAMPLE 14

Comparative Example of Fourth Aspect

A biaxially stretched multilayer film having a thickness of about 10 μm was obtained by simultaneous biaxial stretching by the double bubble method in the same manner as in Comparative Example 11, except that a resin composition consisting of 55 parts of the same ethylene-propylene random copolymer as used in Comparative Example 11 and 45 parts of an ethylene-octene elastomer (Affinity EG8150 from The Dow Chemical Co.) was used to make the layers A' and C'. Similarly to the film of Comparative Example 13, this film fused to itself in the microwave oven test.

The wrap films obtained in Examples 21 to 28 and Comparative Examples 11 to 14 were evaluated for cutting properties, contact, unwinding properties, and heat resistance according to the following methods. The results obtained are shown in Tables 8 and 9, in which "C2-C3 random" stands for an ethylene-propylene random copolymer.

1) Cutting Properties

The stretched film 30 cm wide and 20 m long was wound around a paper core and put in a paper box having a saw blade. The paper core and the paper box were the same as those used in a commercially available PVDC wrap film for domestic use. The paper box was tilted at 45°, and the film was drawn out and cut with the saw blade at an angle of 45° in lengths of about 20 cm ten times. The ease of cutting was graded as follows.

A . . . Capable of being cut more easily than a commercially available household PVDC wrap film.

B . . . Capable of being cut with equal ease to a commercially available household PVDC wrap film.

C . . . Resistance is felt in cutting compared with a commercially available household PVDC wrap film.

2) Contact (or Cling)

A commercially available stainless steel bowl and an onion were each wrapped in the wrap film and put in a refrigerator for 1 day. The cling of the film was observed and graded according to the following standards.

A . . . The bowl and the onion are in a very neatly wrapped state with no lifting of the film.

B . . . The bowl and the onion are in the same wrapped state as with a commercially available PVDC wrap film.

C . . . The film partly loses the contact, and the bowl and the onion are in a loosely wrapped state.

3) Unwinding Properties

A roll of the wrap film was put in a paper container in the same manner as in (1) above and left to stand at 40° C. for 50 days. When the box was held in one hand, and the film was unwound by the other hand, the ease of unwinding was graded as follows.

A . . . Equal or superior to a commercially available PVDC wrap film.

B . . . Slightly resistant as compared with the commercially available PVDC wrap film, but usable.

C . . . The roll was so resistant to unwinding that the film tears or the roll comes out of the box.

4) Heat Resistance

The heat resistance temperature of the film was measured in accordance with the implementing outline for wrap quality labeling based on The Metropolitan Tokyo Consumer Life Ordinance §11, as described above. Further, cold rice was directly wrapped up in the film and reheated in a microwave oven. The wrap was opened to observe whether fusion occurred. The heat resistance of the film was graded based on these results. The heat resistance temperature as referred to here is the highest temperature at which the film does not tear when the film under a given load applied is heated at a temperature elevated stepwise by 5° C.

A . . . The heat resistance temperature is 145° C. or higher. No fusion of the film occurs.

B . . . The heat resistance temperature is 140° C. No fusion of the film occurs.

C . . . The heat resistance temperature is 140° C. Fusion of the film occurs.

D . . . The heat resistance temperature is 135° C. or lower.

5) Overall Judgement on Wrap Performance

The performance of the test film was compared with a commercially available PVDC wrap film in terms of cutting properties, contact, unwinding properties, and heat resistance. The films which were overall superior, equal or inferior to the latter were judged "excellent", "good" and "poor", respectively.

TABLE 8

| | Example 21 | Example 22 | Example 23 | Example 24 |
|---|---|---|---|---|
| Resins of Layers A' & C' (part) | C2–C3 random 100 | C2–C3 random 100 | C2–C3 random 100 | C2–C3 random 100 |
| Resins of Layer B' (part) | C2–C3 random 62.5 elastomer 37.5 | C2–C3 random 62.5 elastomer 37.5 | C2–C3 random 62.5 elastomer 37.5 | C2–C3 random 37.5 elastomer 62.5 |
| Elastomer Content (%) | 30.0 | 28.0 | 28.0 | 30.0 |
| Contact Improving Agent-Feed Improving Agent | not added | added | added | not added |
| | simultaneous biaxial stretching | | | |
| Stretch Method | double bubble | double bubble | tenter | double bubble |
| Thickness (μm) | 10 | 10 | 10 | 12 |
| Ra(μm) | 0.05 | 0.05 | 0.04 | 0.04 |
| Rz(μm) | 0.50 | 0.50 | 0.45 | 0.40 |
| Tensile Modulus [MD/TD](MPa) | 450/420 | 400/380 | 430/430 | 300/280 |
| Elongation at Break [MD/TD](%) | 110/130 | 110/110 | 105/100 | 95/90 |
| Cutting Properties | A | A | A | A |
| Contact | B | A | A | A |
| Unwinding Properties | B | A | A | B |
| Heat Resistance | A | A | A | A |
| Overall Judgement | good | excellent | excellent | excellent |

| | Example 25 | Example 26 | Example 27 | Example 28 |
|---|---|---|---|---|
| Resins of Layers A' & C' (part) | C2–C3 random 100 | C2–C3 random 100 | C2–C3 random 62.5 elastomer 37.5 | C2–C3 random 100 |
| Resins of Layer B' (part) | elastomer 100 | elastomer 80 reclaim 20 | C2–C3 random 62.5 elastomer 37.5 | C2–C3 random 62.5 elastomer 37.5 |
| Elastomer Content (%) | 74.8 | 64.3 | 32.7 | 26.2 |
| Contact Improving Agent-Feed Improving Agent | added | added | added | added |
| | simultaneous biaxial stretching | | | |
| Stretch Method | double bubble | double bubble | double bubble | double bubble |
| Thickness (μm) | 15 | 10 | 10 | 10 |
| Ra(μm) | 0.04 | 0.07 | 0.06 | 0.05 |
| Rz(μm) | 0.40 | 0.60 | 0.65 | 0.50 |
| Tensile Modulus [MD/TD](MPa) | 250/220 | 260/250 | 300/290 | 220/200 |
| Elongation at Break [MD/TD](%) | 80/90 | 100/100 | 100/100 | 80/90 |
| Cutting Properties | A | A | A | A |
| Contact | B | A | A | A |
| Unwinding Properties | A | A | B | A |
| Heat Resistance | A | A | B | A |
| Overall Judgement | good | excellent | good | excellent |

TABLE 9

| | Compara. Example 11 | Compara. Example 12 | Compara. Example 13 | Compara. Example 14 |
|---|---|---|---|---|
| Resins of Layers A' & C' (part) | C2–C3 random 100 | C2–C3 random 100 | LLDPE 100 | C2–C3 random 55 elastomer 45 |
| Resins of Layer B' (part) | C2–C3 random 70 elastomer 30 | elstomer 100 | C2–C3 random 70 elastomer 30 | C2–C3 random 70 elastomer 30 |
| Elastomer Content (%) | 22.4 | 74.8 | 22.4 | 30.8 |
| Contact Improving Agent-Feed Improving Agent | added | added | added | added |
| Stretch Method | simultaneous biaxial stretching | | | |
| | double bubble | tenter | double bubble | double bubble |
| Thickness (μm) | 10 | 10 | 10 | 10 |
| Ra (μm) | 0.05 | 0.04 | 0.03 | 0.04 |
| Rz (μm) | 0.50 | 0.40 | 0.35 | 0.45 |
| Tensile Modulus [MD/TD] (MPa) | 480/460 | 520/780 | 440/410 | 350/340 |
| Elongation at Break [ND/TD] (%) | 120/115 | 190/60 | 110/110 | 115/115 |
| Cutting Properties | A | C | A | A |
| Contact | C | C | A | A |
| Unwinding Properties | A | A | A | A |
| Heat Resistance | A | A | D | D |
| Overall Judgement | poor | poor | poor | poor |

As fully described above, the wrap film according to the first aspect of the invention exhibits good cling to containers with a relatively rough surface such as a stainless steel bowl as well as glassware. It has such good contact as not to allow liquid to leak or spill. It shows satisfactory capability of being cut with a saw blade provided on a box of a roll of wrap film for home use. It possesses sufficient heat resistance for standing use in microwave cooking. Being free of chlorine, it does not produce toxic dioxins on combustion.

The wrap film according to the second aspect of the invention is also excellent in cling to containers with a relatively rough surface such as a stainless steel bowl as well as glassware and also to itself. It exhibits satisfactory performance in unwinding and cutting with satisfactory tear resistance. The transparency of the film can be improved by addition of specific glycerol fatty acid esters.

The multilayer film according to the third aspect of the present invention is equal to conventional ones in such performance characteristics as heat resistance, cutting properties, and contact because all the constituent layer comprise a polypropylene resin with a difference in DSC peak melting temperature. All the layers comprising the polypropylene resin, the residuals generated in the manufacture of the film can be reclaimed. Where, in particular, the multilayer sheet before stretching is a tubular sheet, a stretched multilayer film can be manufactured economically with good workability by adopting a general-purpose process for producing a tubular biaxially stretched film. Use of the polypropylene in all the layers makes the film easy to use as a household wrap film. It is environmentally friendly, producing no harmful chlorine-containing compounds on combustion.

The multilayer film according to the fourth aspect of the present invention has surface layers made mainly of a polypropylene and an intermediate layer made mainly of a polyolefin elastomer resin. It is a simultaneously biaxially stretched film with a controlled elongation at break and a controlled tensile modulus. By these constitution, the film exhibits characteristics equal or superior to those of conventional ones in heat resistance, cutting properties, contact, and unwinding properties. All the constituent layers comprising the polypropylene resin, the residuals generated in the manufacture of the film can be reclaimed similarly to the third aspect. Where, in particular, the multilayer sheet before stretching is a tubular sheet, a stretched multilayer film can be manufactured economically with good workability by adopting a general-purpose process for producing a tubular biaxially stretched film.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

This application claims the priority of Japanese Patent Application Nos. 2000-340916 filed Nov. 8, 2000, 20001-7037 filed Jan. 15, 2001, and 2001-284816 filed Sep. 19, 2001, which are incorporated herein by reference.

What is claimed is:

1. A wrap film comprising a thermoplastic resin composition and having an elongation at break in the longitudinal direction of less than 100% and a strength at 5% elongation in the longitudinal direction of 150 cN/10 mm or less; wherein said thermoplastic resin composition contains a resin having a flexural modulus of 100 MPa or less; wherein the wrap film is a stretched multilayer film having an intermediate layer and a first and second surface layer provided on each side of the intermediate layer, wherein said surface layers comprise a polypropylene resin, and said intermediate layer comprises a polypropylene resin having a flexural modulus of 100 MPa or less and at least one of an ethylene-propylene rubber or an ethylene-α-olefin copolymer in which the α-olefin has 4 or more carbon atoms; wherein a thickness ratio of the first surface layer:intermediate layer: second surface layer is 1:4:1 to 1:10:1.

2. The wrap film according to claim 1, wherein said thermoplastic resin composition mainly comprises a polypropylene resin, and said wrap film is a biaxially stretched film.

3. The wrap film according to claim 1, wherein said thermoplastic resin composition comprises a polypropylene resin having a flexural modulus of 100 MPa or less and at least one of an ethylene-propylene rubber or an ethylene-α-olefin copolymer in which the α-olefin has 4 or more carbon atoms.

4. The wrap film according to claim 1, which is a stretched multilayer film having an intermediate layer and first and a second surface layer provided on each side of the intermediate layer, wherein said surface layers comprise a polypropylene resin, and said intermediate layer comprises an ethylene-α-olefin copolymer in which the α-olefin has 4 or more carbon atoms.

5. The wrap film according to claim 1, which is a stretched multilayer film having an intermediate layer and a first and a second surface layer provided on each side of the intermediate layer, wherein said surface layers comprise a polypropylene resin having a flexural modulus of 500 MPa or more, and said intermediate layer comprises a thermoplastic resin composition having a flexural modulus of 200 MPa or less and containing a polypropylene resin.

6. The wrap film according to claim 5, wherein said thermoplastic resin composition making said intermediate layer contains a resin having a flexural modulus of 100 MPa or less.

7. The wrap film according to claim 1, which is a stretched multilayer film having an intermediate layer and a first and a second surface layer provided on each side of the intermediate layer, wherein said surface layers comprise a polypropylene resin having a flexural modulus of 500 MPa or more, and said intermediate layer comprises a thermoplastic resin composition containing a polypropylene resin and a resin having a flexural modulus of 100 MPa or less.

8. The wrap film according to claim 1, wherein said thermoplastic resin composition contains a tackifier.

9. A wrap film which is a stretched film of a polypropylene resin composition comprising (A) a polypropylene resin, (B) a tackifier comprising a hydrocarbon having a number average molecular weight of 300 to 3000, (C) a nonionic surface active agent having an HLB value of 3.5 to 8, and (D) a nonionic surface active agent or fat and oil having a smaller HLB value than component (C).

10. The wrap film according to claim 9, wherein said polypropylene resin composition comprises 1 to 8 parts by weight of component (B), 0.1 to 2 parts by weight of component (C), and 0.1 to 3 parts by weight of component (D), per 100 parts by weight of component (A), and the proportions of component (C) and component (D) being 3 to 50 parts by weight and 10 to 70 parts by weight, respectively, per 100 parts by weight of component (B).

11. The wrap film according to claim 9, wherein component (B) comprises polybutene, component (C) comprises a glycerol or polyglycerol fatty acid ester having at least one hydroxyl group per molecule, and component (D) comprises a glycerol or polyglycerol fat and oil having at least two acyl groups containing 8 to 18 carbon atoms per molecule.

12. The wrap film according to claim 9, wherein said polypropylene resin composition further comprises (E) a glycerol fatty acid ester represented by formula (I):

wherein two out of $R^1$, $R^2$ and $R^3$ each represent an acyl group having 2 to 6 carbon atoms, with the rest representing an acyl group having 2 to 22 carbon atoms, in an amount of 0.1 to 3 parts by weight per 100 parts by weight of component (A) and 10 to 70 parts by weight per 100 parts by weight of component (B).

13. The wrap film according to claim 12, wherein component (C) is solid at room temperature, and component (E) is liquid at room temperature.

14. The wrap film according to claim 9, wherein said polypropylene resin as component (A) has a propylene content of 88 to 99% by weight.

15. A biaxially stretched polypropylene multilayer film obtained by simultaneous biaxial stretching of a sheet having at least layer A, layer B and layer C in this order, wherein said layer A is made of a resin composition comprising a polypropylene resin and 1 to 15 parts by weight of at least one of polybutene and polyisobutylene per 100 parts by weight of the polypropylene resin, said layer B is made of a resin composition comprising a polypropylene resin and 1 to 20 parts by weight of at least one of polybutene and polyisobutylene per 100 parts by weight of the polypropylene resin, said layer C is made of a resin composition comprising a polypropylene resin and 1 to 15 parts by weight of polybutene per 100 parts by weight of the polypropylene resin, said polypropylene resins used in said layers A, B and C independently have a melt flow rate of 0.5 to 15 g/10 min at 230° C., the DSC peak melting temperature of said resin composition of said layer B exceeds those of said resin compositions of said layers A and C, and the stretch ratios of said sheet in the machine direction and the transverse direction independently range from 3 to 7; and wherein said resin composition of the layer B comprises an amorphous polypropylene copolymer having a Shore U hardness of 55 or smaller.

16. The biaxially stretched multilayer polypropylene film according to claim 15, which is obtained by simultaneously biaxially stretching a tubular sheet having the layers A, B and C in this order with the layer C inside and the layer A outside at stretch ratios in the machine direction and the transverse direction independently ranging from 3 to 7 and slitting the stretched film.

17. The biaxially stretched multilayer polypropylene film according to claim 15, wherein the weight ratio of said layer C to the total layers is 5 to 30%.

18. The biaxially stretched multilayer polypropylene film according to claim 15, wherein the DSC peak melting temperature of said resin composition making the layer B is higher than those of said resin composition making the layer A and said resin composition making the layer C by at least 1° C.

19. The biaxially stretched multilayer polypropylene film according to claim 15, wherein said resin composition of the layer A and said resin composition of the layer C each further comprises an ethylene-propylene copolymer or an ethylene-propylene-butene terpolymer, and the DSC peak melting temperatures of said resin compositions making the layer A and layer C are 145° C. or lower.

20. The biaxially stretched multilayer polypropylene film according to claim 15, wherein said resin composition of the layer B comprises an ethylene-propylene copolymer or an ethylene-propylene-butene terpolymer, and the DSC peak melting temperature of said resin composition of the layer B is 150° C. or lower.

21. The biaxially stretched multilayer polypropylene film according to claim 15, wherein at least one of said resin compositions making the layers A, B and C comprises residuals generated in the production of said multilayer film.

22. The biaxially stretched multilayer polypropylene film according to claim 15, wherein said simultaneous biaxial stretching is at an areal stretch ratio of 10 to 40.

23. A biaxially stretched polypropylene multilayer film obtained by simultaneous biaxial stretching of a sheet having at least layer A, layer B and layer C in this order, wherein said layer A is made of a resin composition comprising a polypropylene resin and 1 to 15 parts by weight of at least one of polybutene and polyisobutylene per 100 parts by weight of the polypropylene resin, said layer B is made of a resin composition comprising a polypropylene resin and 1 to 20 parts by weight of at least one of polybutene and polyisobutylene per 100 parts by weight of the polypropylene resin, said layer C is made of a resin composition comprising a polypropylene resin and 1 to 15 parts by weight of polybutene per 100 parts by weight of the polypropylene resin, said polypropylene resins used in said layers A, B and C independently have a melt flow rate of 0.5 to 15 g/10 min at 230° C., the DSC peak melting temperature of said resin composition of said layer B exceeds those of said resin compositions of said layers A and C, and the stretch ratios of said sheet in the machine direction and the transverse direction independently range from 3 to 7; and wherein the sheet before stretching or the stretched film is irradiated with electron radiation.

24. A biaxially stretched polyolefin multilayer film for wrapping which is obtained by simultaneous biaxial stretching of a sheet having at least layer A', layer B' and layer C' in this order, wherein said stretched film has an elongation at break of 120% or less in both the machine direction and the transverse direction as measured according to JIS Z1712, a tensile modulus of 150 to 450 MPa in both the machine direction and the transverse direction as measured according to JIS Z1712, and a thickness of 8 to 15 μm, said layers A' and C' have a polypropylene resin content of 60% by weight or more and both are surface layers, and said layer B', which is an intermediate layer, is made of a polyolefin resin or a polyolefin resin mixture.

25. The biaxially stretched multilayer polyolefin film for wrapping according to claim 24, which has a surface roughness Ra of 0.08 μm or smaller and a 10 point height parameter Rz of 0.65 μm or smaller, both measured in accordance with JIS B0601.

26. The biaxially stretched multilayer polyolefin film for wrapping according to claim 24, wherein said layer B' comprises 30 to 100% by weight of a polyolefin elastomer resin having a flexural modulus of 100 MPa or less as measured in accordance with JIS K7171 (ISO178:1993).

27. The biaxially stretched multilayer polyolefin film for wrapping according to claim 24, wherein said layers A' and C' have a polypropylene resin content of 90% by weight or more.

* * * * *